(12) United States Patent
Arima et al.

(10) Patent No.: US 6,626,463 B1
(45) Date of Patent: Sep. 30, 2003

(54) SEATBELT DEVICE

(75) Inventors: Takashi Arima, Fujisawa (JP);
Yukinori Midorikawa, Fujisawa (JP);
Hiroshi Yamada, Fujisawa (JP);
Katsuyasu Ono, Fujisawa (JP)

(73) Assignee: NSK Autoliv Co., Ltd., Fujisawa (JP)

( * ) Notice: Subject to any disclaimer, the term of this patent is extended or adjusted under 35 U.S.C. 154(b) by 0 days.

(21) Appl. No.: 09/397,728

(22) Filed: Sep. 17, 1999

(30) Foreign Application Priority Data

Sep. 22, 1998 (JP) .......................................... 10-267816
May 20, 1999 (JP) .......................................... 11-140481

(51) Int. Cl.⁷ ............................................. B60R 22/46
(52) U.S. Cl. ........................ 280/806; 280/735; 280/736
(58) Field of Search ................................. 280/806, 735, 280/801.1; 297/474, 477, 480; 180/268, 271, 282

(56) References Cited

U.S. PATENT DOCUMENTS

| 4,627,639 A | * 12/1986 | Sedlmayr et al. ........... 280/808 |
| 5,552,986 A | * 9/1996 | Omura et al. ............... 180/268 |
| 5,558,370 A | * 9/1996 | Behr .......................... 280/806 |
| 5,564,748 A | * 10/1996 | Kmiec et al. ............... 280/806 |
| 5,605,202 A | * 2/1997 | Dixon ........................ 180/268 |
| 5,615,917 A | * 4/1997 | Bauer ......................... 280/806 |
| 5,667,246 A | * 9/1997 | Miller, III .................. 280/806 |
| 5,788,281 A | 8/1998 | Yanagi et al. |
| 5,983,161 A | * 11/1999 | Lemelson et al. .......... 701/301 |
| 6,085,151 A | * 4/2000 | Farmer et al. ............. 701/301 |
| 6,394,495 B1 | * 5/2002 | Specht ....................... 180/268 |

FOREIGN PATENT DOCUMENTS

| JP | 9-132113 | 5/1997 |
| WO | 96/30235 | 10/1996 |

* cited by examiner

Primary Examiner—Lesley D. Morris
Assistant Examiner—Paul Royal, Jr.
(74) Attorney, Agent, or Firm—Crowell & Moring LLP

(57) ABSTRACT

Provided is a seatbelt device capable of reliably securing and protecting a passenger. This seatbelt device has a first seatbelt tension increasing unit (9a) for increasing the tension of the seatbelt (4), and a second seatbelt tension increasing unit (9b, 20, 30) for increasing the tension of the seatbelt (4). When this seatbelt device judges that the collision of a vehicle is unavoidable, it operates the first seatbelt tension increasing unit (9a) before the collision and operates the second seatbelt tension increasing unit (9b, 20, 30) when it detects the collision of the vehicle. Thereby, the passenger is reliably secured to the seat and his/her safety is ensured.

13 Claims, 17 Drawing Sheets

SEATBELT DEVICE

BACKGROUND OF THE INVENTION

1. Filed of the Invention

The present invention generally relates to a seatbelt device for securing a passenger to a seat with a seatbelt and ensuring the safety of such passenger upon a vehicle collision, and particularly relates to a seatbelt device comprising a plurality of tension-increasing devices for retracting the seatbelt.

2. Description of the Related Art

A passenger security/protection device for vehicles comprising a retractor for winding and unwinding the seatbelt has been conventionally known. For example, the seatbelt device (passenger security/protection system) for vehicles described in Patent Laid-Open Publication No. Hei 9(1997)-132113 controls the seatbelt retractor upon considering the condition between one's car and object and/or the condition of one's car. Particularly, this seatbelt device predicts the collision of one's car with a distance sensor and increases the seatbelt tension when a collision is unavoidable.

The aforementioned seatbelt device for vehicles is capable of trustworthy prediction in an open road as it predicts the collision of one's car with a distance sensor. Nevertheless, an accurate prediction is not possible when the visibility of the road is poor, and there is fear of the seatbelt device making a wrong judgment that a collision will not occur, when in fact it will.

In such case, as the seatbelt device does not attempt to increase the seatbelt tension even upon collision, the seatbelt is not wound at such time, and the passenger is not safely secured in a sufficient manner.

SUMMARY OF THE INVENTION

The present invention was devised in view of the aforementioned problems, and an object thereof is to provide a seatbelt device capable of reliably securing and protecting a passenger.

Another object of the present invention is to provide a seatbelt comprising a plurality of driving element for providing tension to the seatbelt.

Still another object of the present invention is to structure, compactly, a seatbelt comprising an electromotive retractor and pretensioner for providing tension to the seatbelt.

A further object of the present invention is to generate, with certainty, a desired seatbelt tension for ensuring the safety of the passenger upon collision even if the stroke setting of the pretensioner piston is relatively low.

A still further object of the present invention is to prevent malfunctions and undesired operations of the pretensioner, which is only operable once, while seeking the safety upon a collision.

The present invention for achieving the aforementioned objects comprises: a seatbelt for securing a passenger to a seat; a retractor for retracting one end of the seatbelt; a tongue plate to which the seatbelt passes through; a buckle arranged in the vicinity of the abdominal region of the passenger and connected removably to the tongue plate; a collision prediction device for predicting a collision with an obstacle and generating a collision unavoidable signal when it judges that a collision is unavoidable based on the time or distance to the collision; a collision detection device for generating a collision signal by judging a collision based on the impact acceleration inflicted upon the vehicle upon collision; a first seatbelt tension increasing element for increasing the tension of the seatbelt with the collision unavoidable signal; and a second seatbelt tension increasing element for increasing the tension of the seatbelt with the collision signal.

With the structure above, when the collision prediction device judges that the collision of one's vehicle is unavoidable, the seatbelt tension is increased before the collision and the passenger is secured to his/her seat as the slack in the seatbelt is reduced. Moreover, when the collision detection device detects the collision of one's vehicle, the seatbelt tension is further increased immediately after the collision in order to reduce the slack in the seatbelt still more, and the passenger is reliably secured to the seat and the safety of such passenger is ensured thereby.

Preferably, the first seatbelt tension increasing element increases the tension of the seatbelt with the drive of a motor, and the second seatbelt tension increasing element increases the tension of the seatbelt with expansion gas (e.g., combustion gas of powder).

Preferably, the first seatbelt tension increasing element, after activation, continues the operation until a prescribed time (e.g., at least 5 seconds) corresponding to the time or distance to the collision elapses or until the buckle is disengaged. Thereby, the passenger is secured to the seat until the impact of the vehicle collision abates, and such passenger's safety is ensured. In addition, this prevents the release of the tightened seatbelt due to a misjudgment that the danger of collision has been avoided caused by an error in the distance measurement of the collision prediction device at a close range (For example, it is difficult to measure the distance at close range with an infrared laser radar, and there is a possibility that such distance before collision will be immeasurable.) Preferably, the collision prediction device outputs the collision unavoidable signal at least 0.1 second before the collision, and the first seatbelt tension increasing element operates before the collision.

Preferably, the first and second seatbelt tension increasing element are provided to a center pillar (pillar between the front door and rear door) of the vehicle body or to the retractor installed within the seat.

Preferably, the first seatbelt tension increasing element is provided to the retractor, and the second seatbelt tension increasing element is mounted, for example, on the buckle, lap-outer portion at the lower part of the center pillar of the vehicle body, or the body panel.

Preferably, the collision prediction device predicts the collision by measuring the distance to the obstacle using an infrared laser radar, millimeter wave radar, ultrasonic radar, or stereo camera mounted on the vehicle, and obtains the time until collision by dividing such distance with the speed of one's vehicle, and judges whether or not the collision is avoidable.

Preferably, the activation of the second seatbelt tension increasing element is judged based on the impact upon the vehicle collision and the activation of the first seatbelt tension increasing element is judged based on the distance between one's vehicle and the obstacles in its periphery.

With the structure above, as the second seatbelt tension increasing element (gas-expansion or powder pretensioner) operates when there is little slack in the seatbelt due to the operation of the first seatbelt tension increasing element, it is possible to ensure the necessary security of the passenger even if the seatbelt retractability of the second seatbelt tension increasing element is small. Therefore, a gas-expansion (or powder) pretensioner with small seatbelt retractability may be miniaturized and easily housed in a small setup space within a car.

Moreover, by foremost operating the first seatbelt tension increasing element (e.g., electromotive retractor) by predicting the danger of collision and thereafter operating the second seatbelt tension increasing element (e.g., gas-expansion or powder pretensioner) in correspondence with the actual impact of the collision, it is possible to skillfully use in combination a first seatbelt tension increasing element, wherein the seatbelt tension and security are relatively small but may be used repeatedly, and the second seatbelt tension increasing element, wherein the seatbelt tension and security are large but may be used only once.

The seatbelt device according to the present invention comprises: a seatbelt for securing a passenger to a seat of a vehicle; a pretensioner (second seatbelt tension increasing element) for rapidly retracting the seatbelt; an electromotive retractor (first seatbelt tension increasing element) for retracting the seatbelt with a motor; collision detection element for detecting the impact (or collision) of the vehicle; collision prediction element for predicting the collision (or danger thereof) of the vehicle; and a control unit for controlling the operation of, at the least, the electromotive retractor and the pretensioner based on the respective outputs of the collision detection element and the collision prediction element.

The control unit operates the retractor based on the output of the collision prediction element and thereafter operates the pretensioner based on the output of the collision detection element.

Preferably, the control unit changes the detection standard of the collision detection element in accordance with the action/non-action of the retractor.

Preferably, the control unit changes the operation standard of the pretensioner based on the output of the collision detection element when it operates the retractor based on the output of the collision prediction element.

With the structure above, as the pretensioner operates when there is little slack in the seatbelt due to the electromotive retractor, the effect of the pretensioner is large. Moreover, the necessary security of the passenger is ensured even if the seatbelt retractability of the pretensioner is small. The pretensioner can thereby be miniaturized and may be housed in a small setup space within the car As the passenger is secured by the seatbelt being retracted in advance with the retractor, the pretensioner maybe set to operate when the impact upon the collision is substantially large. Therefore, it is possible to prevent malfunctions of the pretensioner and reduce the repair costs upon operation thereof, as the pretensioner may be used only once.

DESCRIPTION OF THE PREFERRED EMBODIMENTS (First Embodiment)

Figure 1:
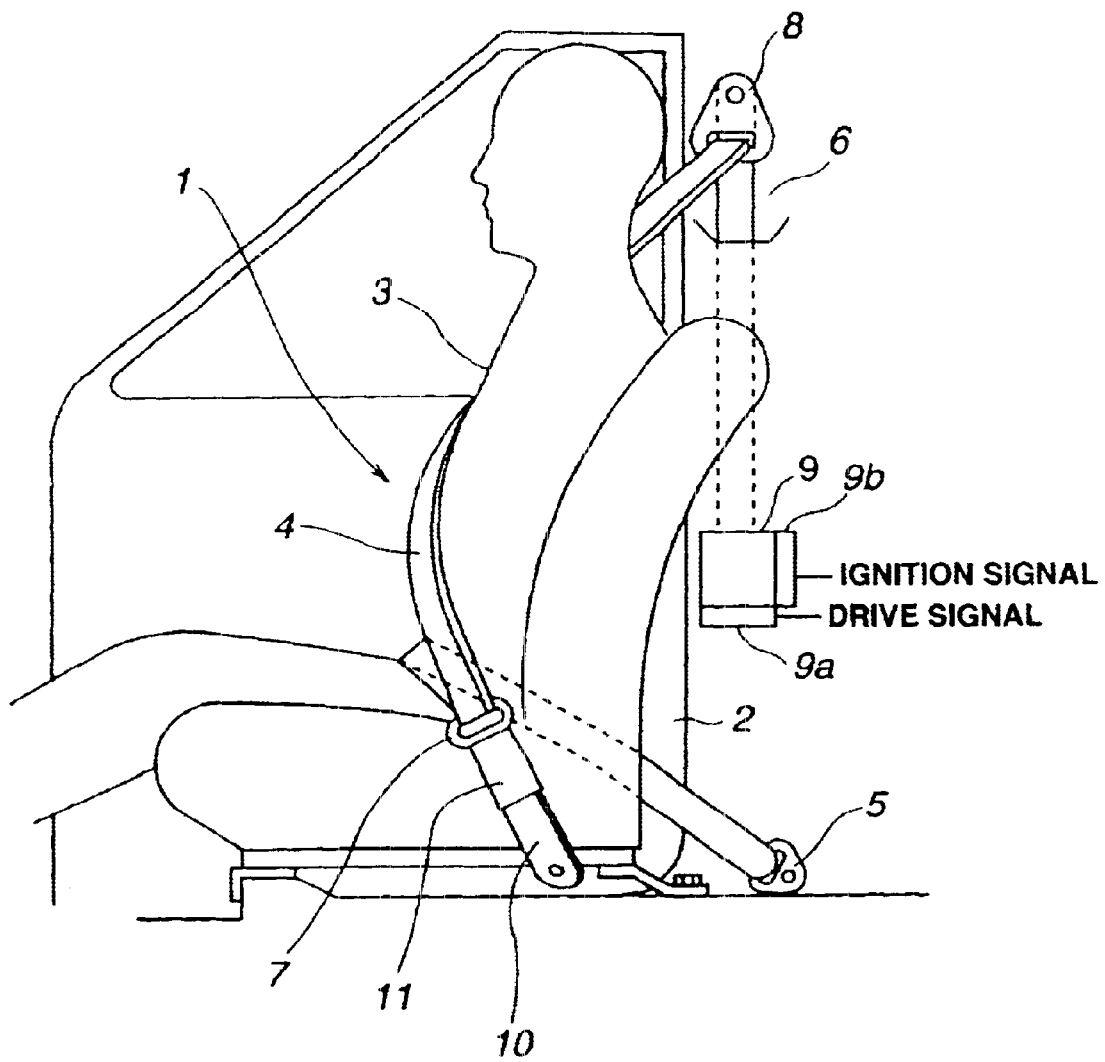
FIG. 1 is a diagram explaining the first embodiment of the seatbelt device according to the present invention.

Embodiments of the present invention are now explained with reference to the relevant drawings. FIG. 1 shows the structural example of the first seatbelt device according to the present invention.

In FIG. 1, a passenger 3 sitting in a seat 2 installed within the interior of a vehicle is wearing a seatbelt (or webbing) 4. One end of the seatbelt 4 is mounted with an anchor plate 5 on the lower part of the vehicle (center pillar) wall or the lower side of the seat, and the other end thereof is retracted with a retractor 9 via a through ring 8 mounted on the upper part of the vehicle wall. The retractor 9 comprises a motor 9a. Thereby, the seatbelt 4 may be retracted, protracted, locked and so forth pursuant to an order from the control unit explained later. Moreover, the retractor 9 further comprises a pretensioner 9b for generating expansion gas and rapidly retracting the seatbelt 4 upon a vehicle collision.

A tongue plate 7 for movably folding back the seatbelt 4 is provided to the midway part of the seatbelt 4. A supporting member 10 retains a buckle 11 at the side of the seat 2, at the approximate abdominal region of the passenger. By inserting the tongue plate 7 into the buckle 11 and making an engagement, the tongue plate 7 and buckle 11 are connected, and the seatbelt 4 is fastened while being supported in three points. This fastening is detected with a switch provided within the buckle 11.

Figure 2:
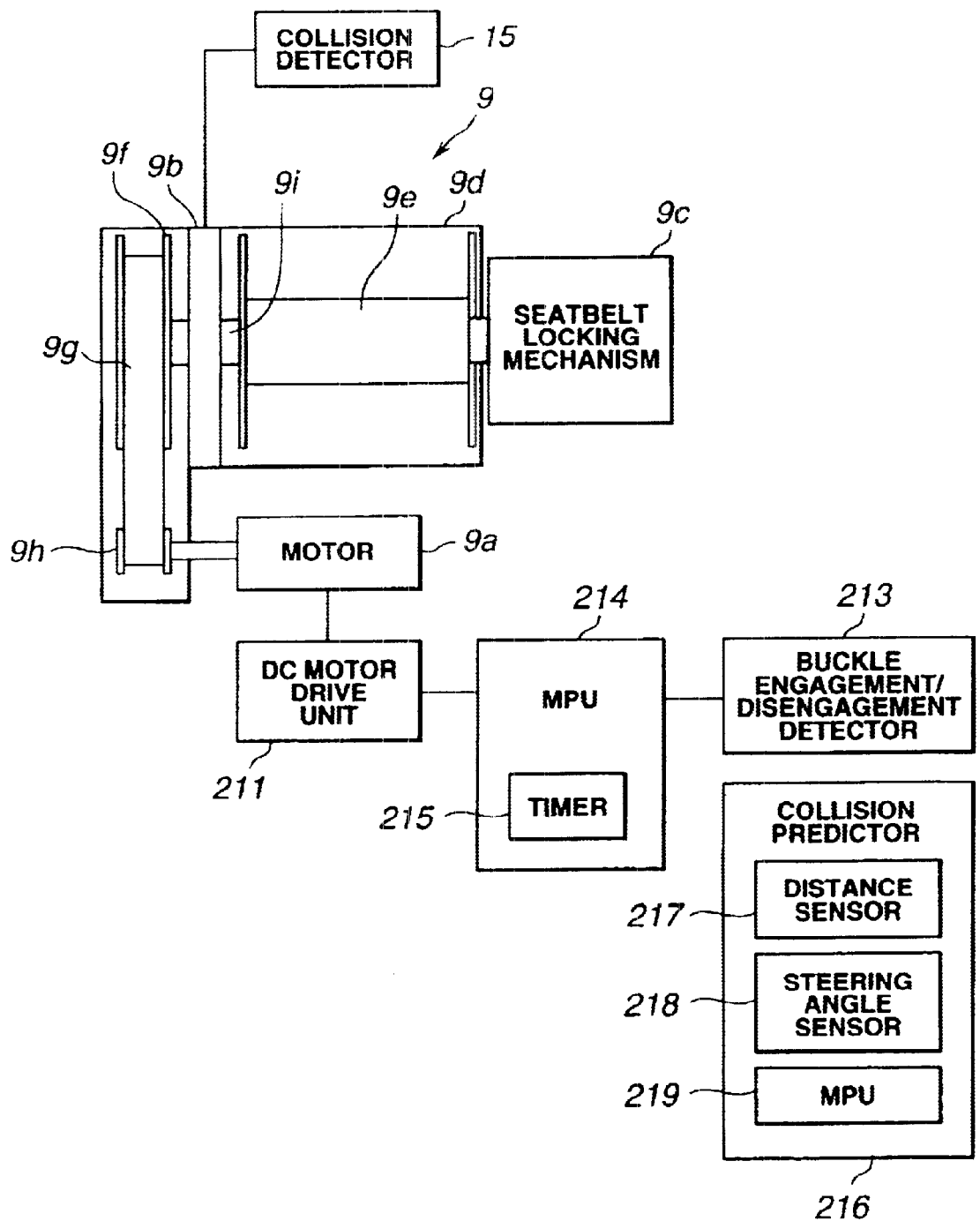
FIG. 2 is a diagram showing the structure of the electromotive retractor and control unit, which the seatbelt device for vehicles comprises, pertaining to the embodiments of the present invention.

FIG. 2 is a diagram showing the structure of the retractor 9, which the seatbelt device 1 comprises. The retractor 9 comprises a frame 9d. To this frame 9d, a reel shaft 9e for retracting the seatbelt is rotatably established and a well-known seatbelt locking mechanism 9c, which locks the protraction of the seatbelt when a prescribed deceleration works on the vehicle or when the seatbelt protracts upon a prescribed acceleration, is fixed.

A central axis 9i of the reel shaft 9e is connected to the central axis of the pretensioner mechanism 9b and the central axis of the reel shaft pulley 9f. A collision detector 15 for detecting the collision of a vehicle is connected to the pretensioner mechanism 9b.

Figure 3:
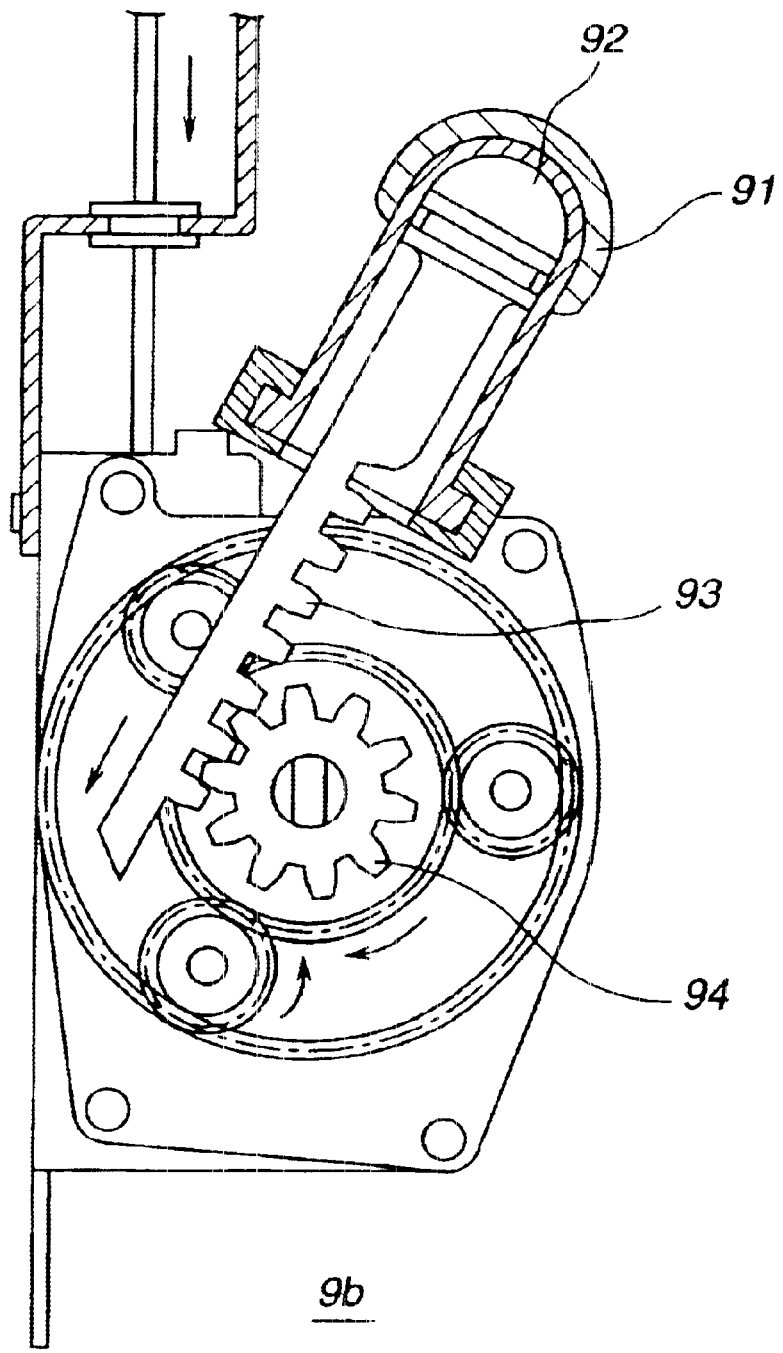
FIG. 3 is a structural diagram of the pretensioner mechanism 9b.

FIG. 3 is a structural diagram of the pretensioner mechanism 9b. This pretensioner mechanism 9b is a powder pretensioner for example, and comprises a gas chamber 92 for sealing the gas generated from the gas generator 91, a pinion 94 connected to the central axis 9i of the reel shaft 9e and having a prescribed number of outer gear teeth formed thereon, and a rack 93 in which one end thereof has inner gear teeth for engagement with such prescribed number of outer gear teeth and the other end thereof hermetically seals the gas filled in the gas chamber 92.

When a collision of one's vehicle is detected by the collision detector 15 and an ignition (activation) signal is input to the pretensioner mechanism 9b, gas is generated from the gas generator 91 and filled in the gas chamber 92. As this gas is hermetically sealed with the rack 93, the pressure of the gas chamber rises, and the rack 93 is pushed down. When the rack 93 is pushed down, the pinion 94 rotates while interlocking with the movement of the rack 93, and the reel shaft 9e connected to the pinion 94 rotates to the retracting side of the seatbelt. This results in the rapid retraction of the seatbelt upon a vehicle collision. If the pretensioner 9b does not operate, the structure does not hinder the rotation of the reel shaft 9e.

Figure 4:
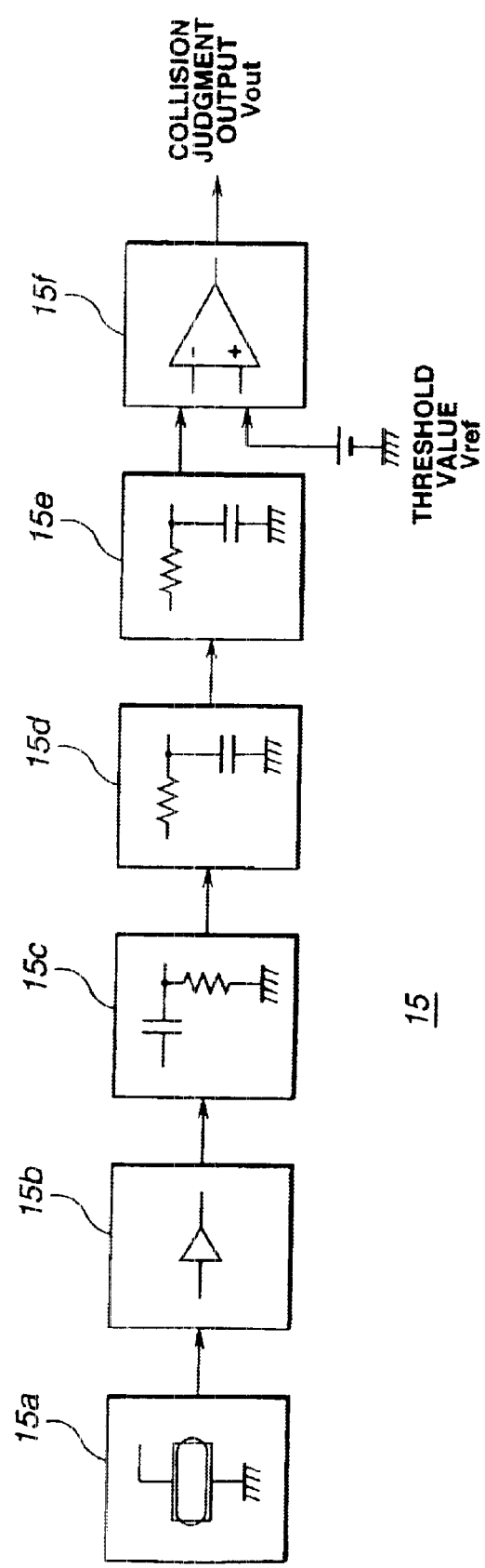
FIG. 4 is a block diagram showing the structure of the collision detector 15.

FIG. 4 is a block diagram showing the structure of the collision detector 15. As shown in FIG. 4, the collision detector 15 comprises an acceleration sensor 15a for detecting the acceleration of a vehicle. The acceleration signal obtained from the acceleration sensor 15a is amplified to a prescribed level with a buffer amp 15b. With respect to the amplified acceleration signal, the possibility of misjudgment caused by the rise in the acceleration signal observable during the latter half of a low-speed collision can be decreased by attenuating unnecessary frequency components with a high-pass filter 15c. The high-pass filter 15c is a so-called CR-type high-pass filter using resistance and a condenser. The output signal of the high-pass filter 15c is foremost converted into "speed" by being integrated with the low-pass filter 15d and then converted into "displacement" by being integrated with the low-pass filter 15e. Low-pass filters 15d, 15e are structured using resistance and a condenser, and conduct the presumptive operation of the passenger's variation amount. The obtained displacement corresponding amount is compared with the threshold value Vref predetermined in the comparator 15f. The result of such comparison is output as the collision judgment output Vout. This collision judgment output Vout is used as the activation signal of the pretensioner mechanism 9b.

Referring back to FIG. 2, the reel shaft pulley 9f is connected to the direct current (DC) motor pulley 9h via the timing belt 9g.

A prescribed number of outer gear teeth are formed respectively on the outer periphery of the reel shaft pulley 9f and the DC motor pulley 9h. A prescribed number of teeth are also formed on the inner periphery of the timing belt 9g. The outer gear teeth of the reel shaft pulley 9f and the DC motor pulley 9h are engaged with the inner gear teeth of the timing belt 9g in proper quantities.

The central axis of the DC motor pulley 9h is connected to the motor 9a. Thus, the rotation of the motor 9a is transmitted to the reel shaft 9e via the DC motor pulley 9h.

The motor 9a is fixed to the frame 9d in at least two points. The motor 9a is connected to the MPU (Micro Processing unit) via a DC motor drive unit 211. The DC motor drive unit 211 controls the rotation of the motor 9a based on PWM (Pulse Width Modulation) signals from the MPU 214.

Figure 5:
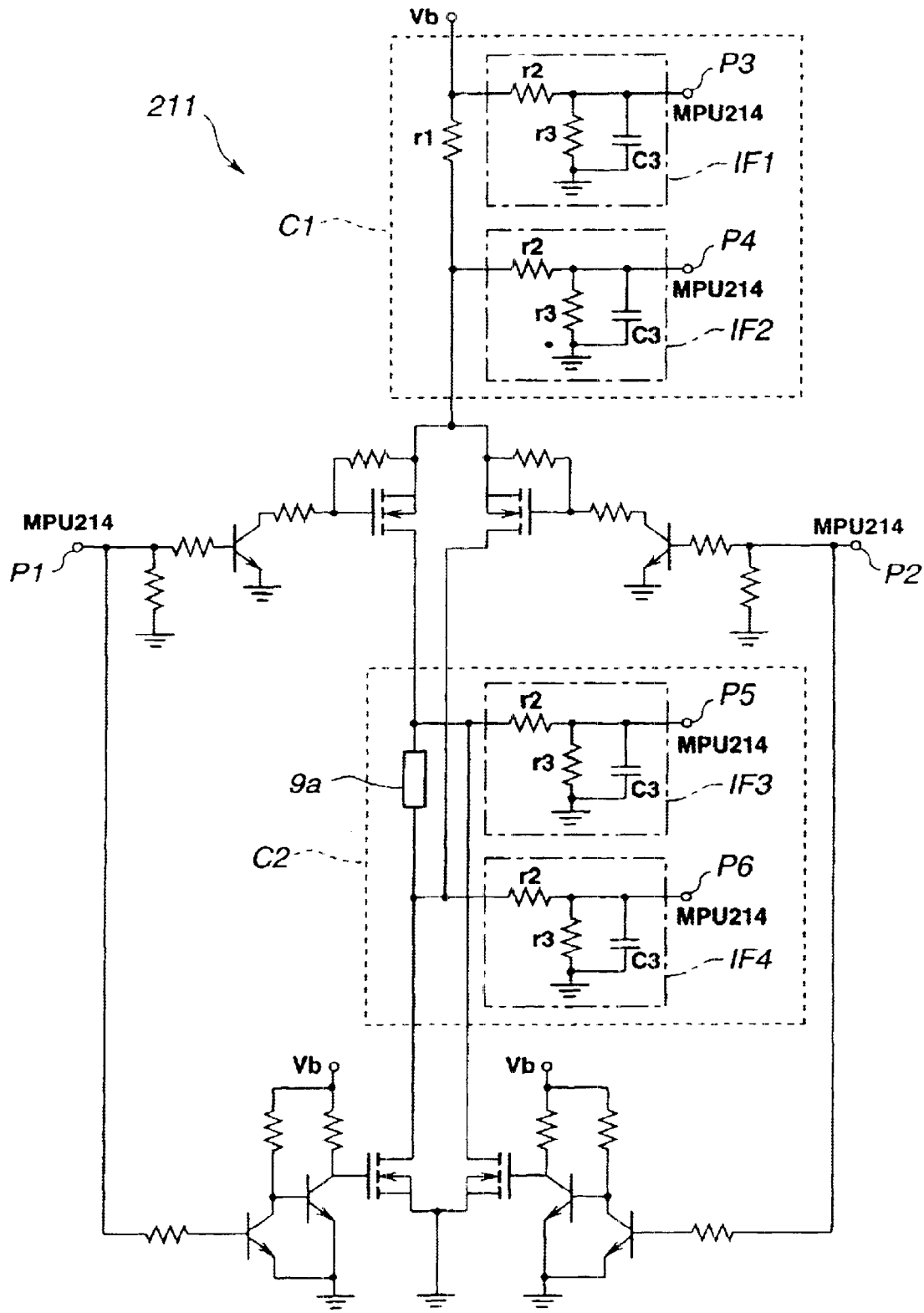
FIG. 5 is a circuit diagram showing the structure of the direct current (DC) motor drive unit 211.

FIG. 5 is a circuit diagram of the DC motor drive unit 211. Terminals P1 and P2 shown in FIG. 5 are input terminals of PWM (Pulse Width Modulation) signals output from the MPU 214. Input to terminals P1 and P2 are, for example, 20 kHz PWM signals. Terminals P3 and P4 are output terminals for electric current detection. Terminals P5 and P6 are output terminals for voltage detection. Terminals P1 through P6 are respectively connected to the MPU 214. The voltage Vb shown in FIG. 5 is supplied to the motor 9a. The plurality of transistors and FETs in FIG. 5 are for driving the rotation of the motor 9a in a normal rotation or reverse rotation pursuant to PWM signals from the MPU 214.

The circuit C1 in FIG. 5 is an electric current detection circuit for detecting the electric current i flowing to the motor 9a from the electric current flowing to the resistance r1. This circuit c1 comprises interface (hereinafter "IF") circuits IF1 and TF2. The MPU 214 receives voltage signals respectively from IF1 and IF2, and detects the electric current i flowing to the ,motor 9a based on these voltage signals.

The circuit C2 is a voltage measuring circuit for measuring the voltage between terminals flowing to the motor 9a and comprises IF3 and IF4 for removing fluctuations of the voltage between terminals influenced by PWC signals. The MPU 214 receives voltage signals from IF3 and IF4 respectively and measures the voltage between terminals flowing to the motor 9a based on such voltage signals.

IF1 through IF4 have a low-pass filter structure made from, for example, resistance r3, which has a lower resistance value than resistance r1 and resistance r2, and a condenser c3, and are set to, for example, 20 Hz. Thereby, the influence to the PWM signals output to the MPU 214 with the electric current detection circuit C1 and voltage measurement circuit C2 is reduced to −60 dB. Thus, the electric current to be originally detected with the electric current detection circuit C1 and the voltage between the terminals to be measured by the voltage measurement circuit C2 are hardly influenced.

Referring again to FIG. 2, the MPU 214 comprises a timer 215 for measuring the time. Supplied to the MPU 214 are the respective outputs from the buckle connection detection device 213 explained later and the collision detector 216.

The MPU 214 judges whether the seatbelt has been protracted according to the polarity of the voltage between the terminals of the motor 9a. The MPU 214 further judges whether the retraction of the seatbelt has finished according to the electric current i flowing to the motor 9a.

The MPU 214 performs a plurality of controls. For example, when the MPU 214 detects a protraction of the seatbelt 4 upon the passenger fastening the seatbelt 4, it performs the seatbelt fastening assistance control for controlling the motor 9a so that the seatbelt 4 can be easily protracted. The MPU 214 retracts the seatbelt 4 after the tongue plate 7 of the seatbelt 4 is fastened to the buckle 11 and, after the seatbelt 4 is fitted to the passenger's body and the retraction of the seatbelt 4 has reached its limit, performs the seatbelt oppression removal control for controlling the motor 9a so as to provide the passenger with a prescribed slack. The MPU 214 further performs the motion control for controlling the motor 9a so as to make the seatbelt easily protractable when a passenger tries to protract the seatbelt 4 such that he/she may move after the seatbelt 4 has been fastened. Moreover, the MPU 214 performs the housing control for controlling the motor 9a so as to house the seatbelt when a passenger retracts the seatbelt 4 but does not fasten it or when the tongue plate 7 of the seatbelt is disengaged from the buckle 11.

The buckle connection detector 213 detects whether the tongue plate 7 of the seatbelt 4 is fastened to the buckle 11 or whether the tongue plate 7 of the seatbelt 4 is disengaged from the buckle 11 and outputs to the MPU 214 control signals corresponding thereto.

The collision detector 216 comprises a distance sensor 217 for measuring the distance between one's car and the object in front of one's car (a vehicle or obstacle in the frontward direction), a steering angle sensor 218 for detecting the steering angle of the steering wheel, and an MPU 219 for controlling the distance sensor 217 and the steering angle sensor 218.

The distance sensor 217 outputs to the MPU 219 control signals showing the measurement results of the distance between one's car and the object in front of one's car. The MPU 219 calculates a safe car interval distance ds obtainable from the formula (1) below and, when this safe car interval distance ds is larger than the value output from the distance sensor 217, outputs to the MPU 214 control signals showing a collision danger warning. At such time, the MPU 214 performs collision danger warning control for alternately protracting and retracting the seatbelt 4 in a repetitive manner. Thereby, the passenger 3 will recognize that there is a danger of collision. Furthermore, the MPU 219 calculates a collision unavoidable distance dd obtainable from the formula (2) below and, when this collision unavoidable distance dd is larger than the value output from the distance sensor 217, outputs to the MPU 214 control signals showing that a collision is unavoidable. At such time, the MPU 219 performs collision unavoidable control for changing the retraction power of the seatbelt in accordance with the value output from the distance sensor 217 and retracting the seatbelt thereafter. The passenger is thereby appropriately protected upon a collision.

$$ds = Vr \times (td + \beta) \quad (1)$$

$$dd = Vr \times td \quad (2)$$

ds: safe car interval distance (unit: m)
dd: collision unavoidable distance (unit: m)
Vr: relative speed (unit: m/s)
td: response delay of driver (e.g., 0.5 to 2 seconds)
β: value determined by braking characteristic of vehicle (e.g., 0.5 to 2 seconds)

The steering angle sensor 218 outputs to the MPU 219 control signals corresponding to the steering angle of the steering wheel. When the maximum value of the variation amount of the steering angle within a prescribed time (2 seconds for example) is within a prescribed value (8 degrees for example), the MPU 219 judges that there is an indication of the driver driving asleep and outputs to the MPU 214 control signals showing a warning thereof. At such time, the MPU 214 performs sleep driving prevention control for alternately protracting and retracting the seatbelt in a repetitive manner. The driver may thereby recognize that he/she was driving asleep.

Figure 6:
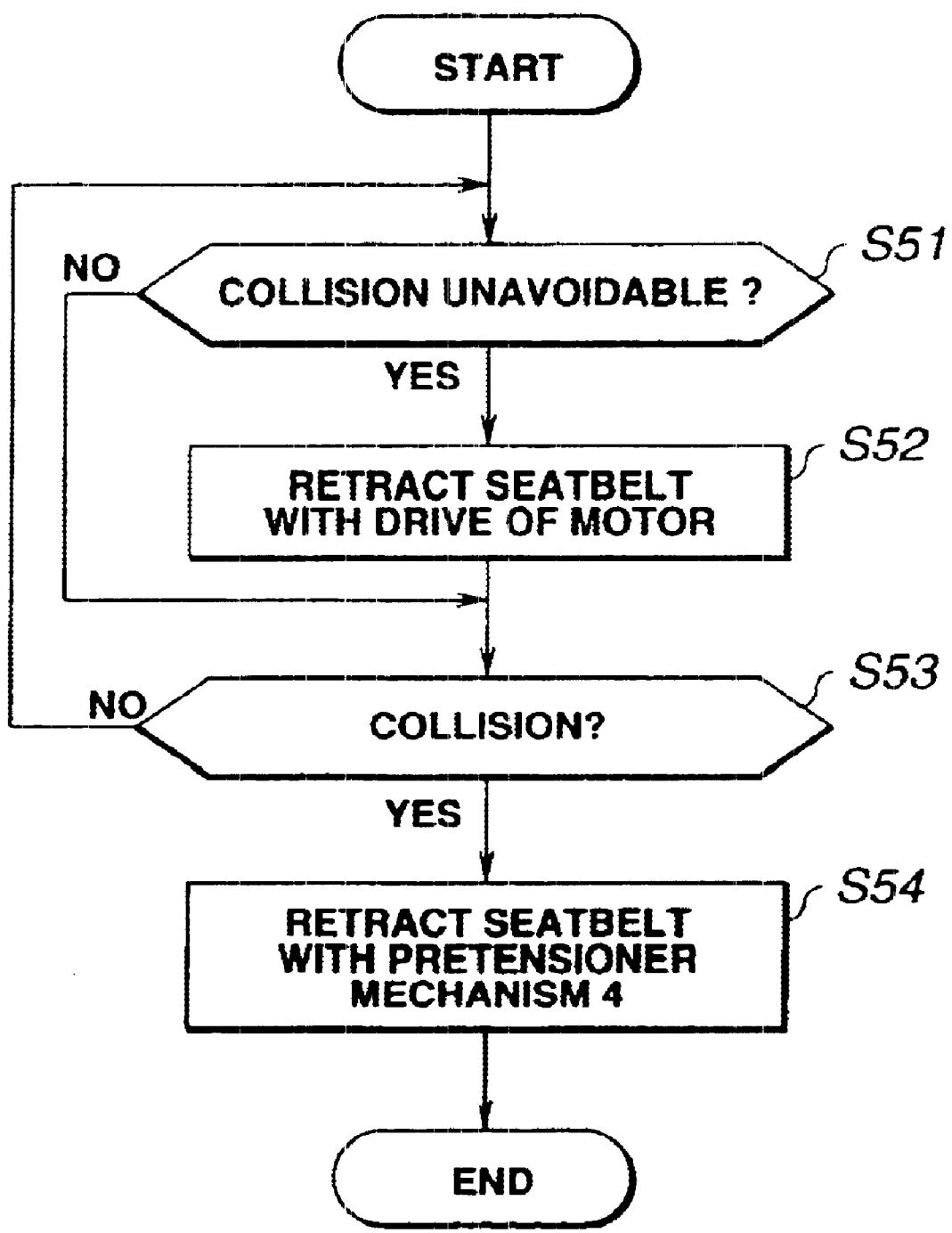
FIG. 6 is a flowchart showing the control of the electromotive retractor 9 before and after the collision of a vehicle.

FIG. 6 is a flowchart explaining the control procedures performed by the electromotive retractor 9 with a pretensioner before and after the vehicle collision.

Foremost, prior to the vehicle collision, the MPU 219 of the collision predictor 216 judges whether the collision is unavoidable (step S51) and, when it is not unavoidable (S51; No), proceeds to step S53 explained later. Contrarily, when the collision is unavoidable (S51; Yes), control signals showing that the collision is unavoidable is sent from the MPU 219 to the MPU 214, the MPU 214 then increases the driving force of the motor 9a, and the seatbelt 4 is retracted (step S52). Thereby, the tension of the seatbelt 4 is increased.

By changing the duty ratio of PWM signals input to the DC motor drive unit 211, the driving force of the motor 9a may be increased, and the tension of the seatbelt 4 is thereby increased. Preferably, the operation is continued for a prescribed time (5 seconds for example) after activation of the motor 9a, or until the buckle 11 is disengaged. It is thereby possible to secure the passenger to his/her seat from the collision unavoidable judgement until the impact has abated after the vehicle collision.

The collision detector 8 judges whether a vehicle collision is detected (step S53) and, when no vehicle collision is detected (S53; No), returns to step S51. Contrarily, when a vehicle collision is detected (S53; Yes), an ignition signal is input from the collision detector 8 to the pretensioner mechanism 9b, the pretensioner mechanism 9b retracts the seatbelt 4 with the power of gas generated from the gas generator 91 (step S54), and this control is thereby completed The tension of the seatbelt 4 will also increase with the retraction of the seatbelt 4 by the pretensioner in step S54.

As mentioned above, according to the present embodiment, the MPU 214 increases the tension of the seatbelt 4 by increasing the driving force of the motor 9a and retracting the seatbelt 4 (step S52) when it is judged that a collision is unavoidable prior to a vehicle collision. When a vehicle collision is detected, the pretensioner mechanism 9b increases the tension of the seatbelt 4 by rapidly retracting the seatbelt 4 with the power of the gas generated from the gas generator (step S54). The passenger is reliably secured and protected as the slack in the seatbelt is removed and the tension of the seatbelt 4 is increased before the collision, and such tension is further increased after the collision.

For example, even if the collision predictor 216 predicts that the collision is avoidable when in fact it is not, the tension of the seatbelt 4 is increased as the pretensioner 9b retracts the seatbelt 4 immediately after the collision. Thus, it is possible to reliably secure and protect the passenger 3.

For example, even if the pretensioner 9b fails to retract the seatbelt 4 in an ordinary timing due to an unexpected collision portion of one's vehicle, the MPU 214 increases the driving force of the motor 9a, retracts the seatbelt 4 (step S52), and increases the tension of the seatbelt 4 before the vehicle collision. Thus, it is possible to reliably secure and protect the passenger 3. Accordingly, in comparison to securing and protecting the passenger 3 only upon detecting the collision, it is further possible to appropriately secure and protect the passenger 3.

Although in the present embodiment the retraction of the seatbelt 4 is conducted with the driving force of the motor 9a and the pretensioner 9b, it is possible to replace the pretensioner 9b with a separate motor, drive the motor 9a before the collision, and drive the replaced motor immediately after the collision. This will also yield the same advantages of the present invention.

As described in detail above, according to the aforementioned seatbelt device, the first seatbelt tension increasing element is driven when the collision prediction element predicts a vehicle collision and the second seatbelt tension increasing element is driven when the collision detection element detects a vehicle collision. Thus, the slack in the seatbelt is removed and the seatbelt tension is increased by the first seatbelt tension increasing element before the vehicle collision and such tension is further increased by the second seatbelt tension increasing element after the collision. The passenger is thereby reliably secured and protected.

For example, even if the collision prediction element predicts that the collision is avoidable when in fact it is not, the second seatbelt tension increasing element operates immediately after the collision. Thus, it is possible to reliably secure and protect the passenger.

For example, even if the second seatbelt tension increasing element does not operate in an ordinary timing immediately after the collision, the first seatbelt tension increasing element operates before the collision. Thus, it is possible to reliably secure and protect the passenger. Accordingly, in comparison to securing and protecting the passenger only upon detecting the collision, it is further possible to appropriately secure and protect the passenger.

(Second Embodiment)

The second embodiment of the seatbelt device according to the present invention is now explained with reference to the relevant drawings.

The size of the electromotive retractor with a pretensioner easily becomes large as it comprises both a pretensioner and a motor. When the size is large, it becomes difficult to house the electromotive retractor with a pretensioner within the center pillar of the vehicle.

When trying to secure sufficient retractability with only the pretensioner upon an actual collision without equipping the retractor with a motor, it is necessary to lengthen the piston stroke within the pretensioner, and the size of the pretensioner thereby becomes large. Even if this pretensioner and the seatbelt retractor are structured integrally, the external shape of the device easily becomes large.

Even if structuring the pretensioner separately from a non-electromotive retractor, places where the pretensioner may be mounted are, for example, the gap between the seat and the body center pillar or the small space at the lower part of the center pillar on the side of the seat. Thus, due to the restrictions on the shape of the device, the seatbelt retractability cannot be made large.

As a result thereof, when a passenger is wearing the seatbelt with slack, it is considered that a desired tension sufficient for securing the passenger to the seat cannot be obtained even if the seatbelt is retracted by the operation of the pretensioner.

Therefore, in the second embodiment, the electromotive retractor and the pretensioner are structured separately.

Figure 7:
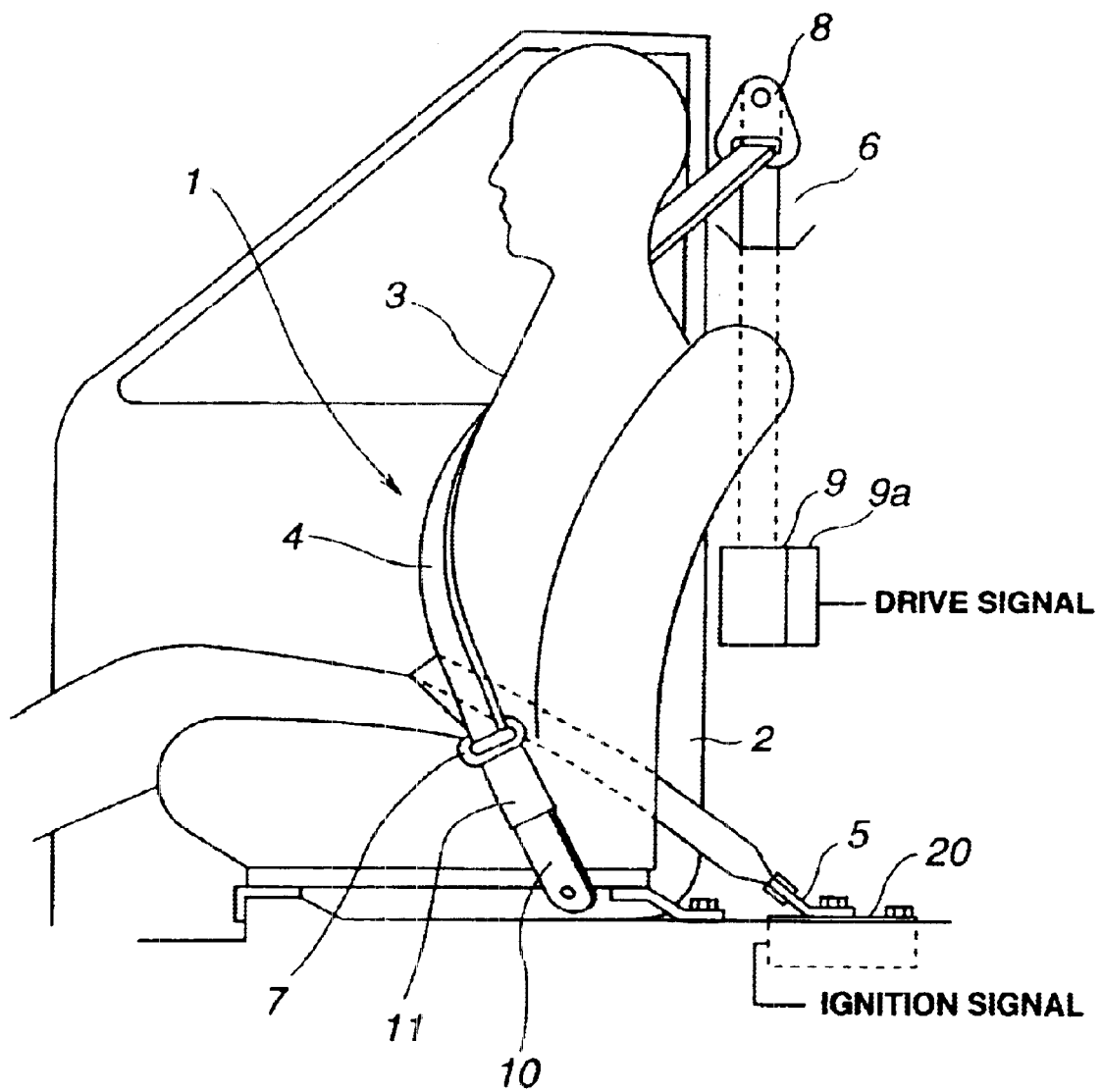
FIG. 7 is a diagram explaining the second embodiment of the seatbelt device according to the present invention.

FIG. 7 shows an example of the seatbelt device according to the second embodiment of the present invention. In FIG. 7, the portions corresponding to FIG. 1 are given the same reference numerals. The passenger 3 sitting in the seat 2 installed within the interior of the vehicle is wearing a seatbelt 4. One end of the seatbelt 4 is mounted with an anchor plate 5 on the lower part of the vehicle wall or the lower side of the seat, and the other end thereof is retracted with a retractor 9 via a through ring 8 mounted on the upper part of the vehicle wall (center pillar). The retractor 9 comprises a motor 9a. Thereby, the seatbelt 4 may be retracted, protracted, locked and so forth pursuant to an order from the control unit explained later.

A tongue plate 7 for movably folding back the seatbelt 4 is provided to the midway part of the seatbelt 4. A supporting member 10 retains a buckle 11 at the side of the seat 2, at the approximate abdominal region of the passenger. By inserting the tongue plate 7 into the buckle 11 and making an engagement, the tongue plate 7 and buckle 11 are connected, and the seatbelt 4 is fastened while being supported in three points. This fastening/unfastening is detected with a switch 103 explained later provided within the buckle 11.

An anchor plate 5 provided on one end of the seatbelt 4 is mounted on a lap-outer pretensioner 20 with a bolt. The lap-outer pretensioner 20 retracts the seatbelt 4 and secures the passenger to his/her seat upon an actual collision.

Figure 8:
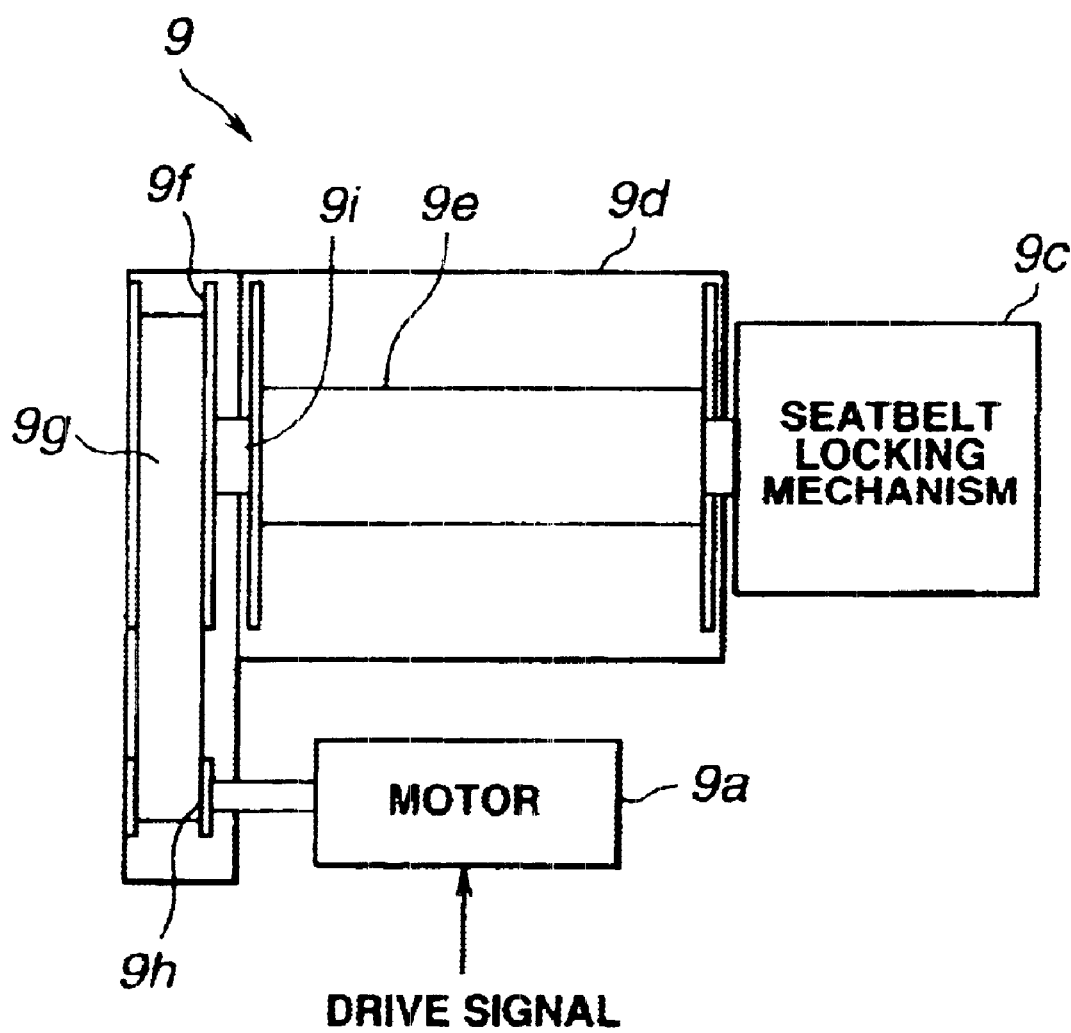
FIG. 8 is a diagram explaining an example of the electromotive retractor 9.
Figure 9:
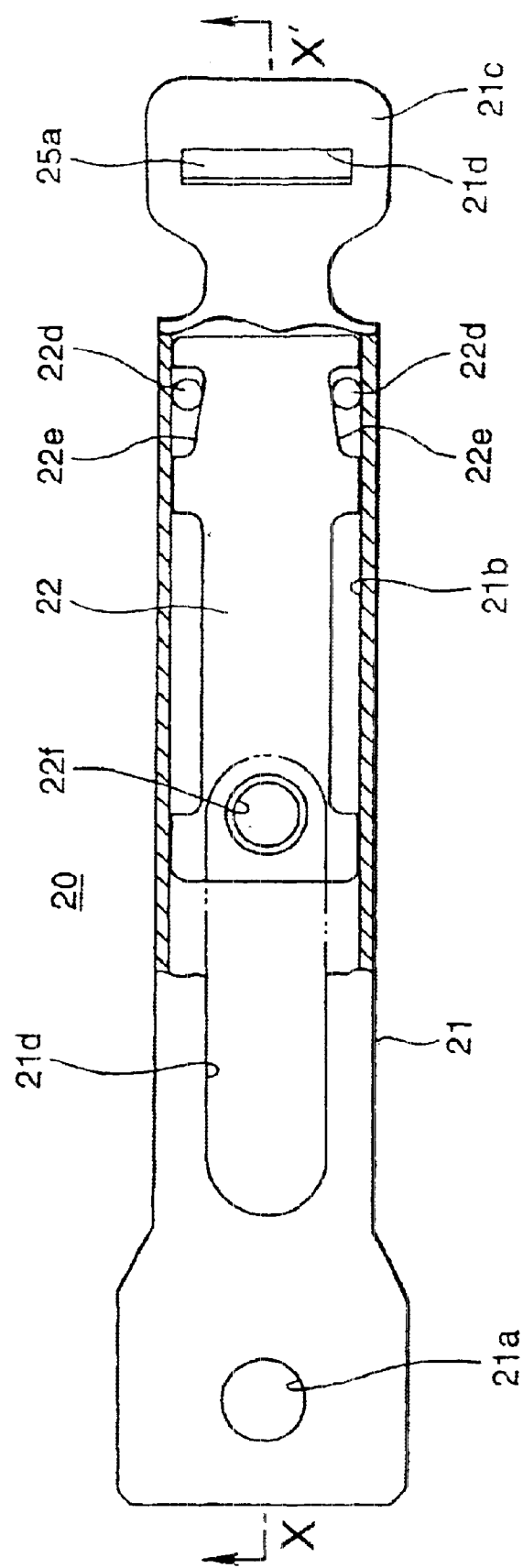
FIG. 9 is a plan view showing an example of the lap-outer pretensioner 20.

FIG. 8 shows a structural example of the electromotive seatbelt retraction device (electromotive retractor) 9. The electromotive seatbelt retraction device 9 comprises a frame 9d. A reel shaft 9e for retracting the seatbelt 4 is rotatably established on the frame 9d. Provided to the right end of the reel shaft 9e is a seatbelt locking mechanism 9c for locking the protraction of the seatbelt 4 when a prescribed deceleration works on the vehicle or when the seatbelt 4 is protracted by prescribed acceleration. The central axis 9i of the reel shaft 9e is connected to the central axis of the reel shaft pulley 9f, and this reel shaft pulley 9f is connected to the motor 9a via the timing belt 9g. A prescribed number of outer gear teeth are respectively formed on the outer periphery of the reel shaft pulley 9f and the DC motor pulley 9h. A prescribed number of inner gear teeth are also formed on the inner periphery of the timing belt 9g. The outer gear teeth of the reel shaft pulley 9f and the direct current motor 9h are engaged with the inner gear teeth of the timing belt 9g in proper quantities.

The central axis of the DC motor pulley 9h is connected to the motor 9a. Therefore, the rotation of the motor 9a is transmitted to the reel shaft 9e via the DC motor pulley 9h. The direct current motor 9a is fixed to the frame 9d in at least two points, and is driven and controlled by the output interface 115 within the control unit 110 explained later.

This seatbelt retractor 9 with a motor automatically performs the retraction and protraction of the seatbelt 4, and seeks the comfortableness of the passenger upon such passenger fastening the seatbelt.

Figure 10:
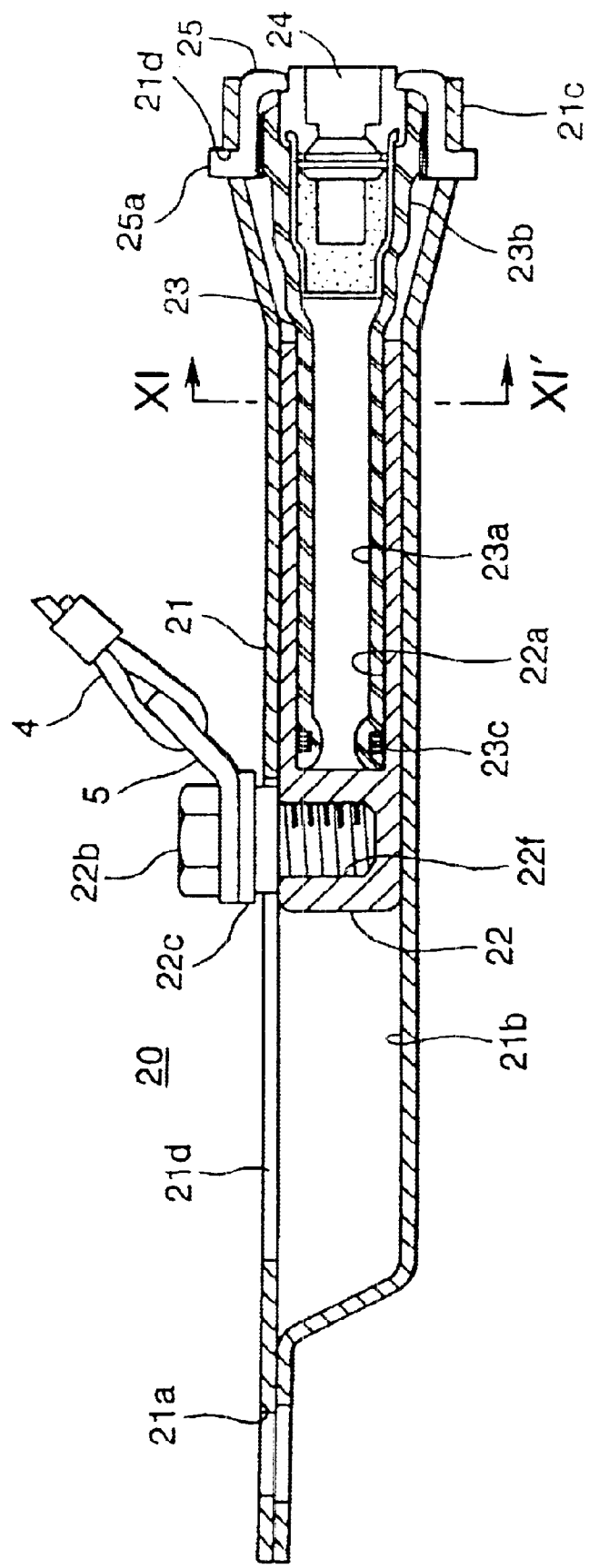
FIG. 10 is a sectional view showing the section of the lap-outer pretensioner 20 in the X–X' direction of FIG. 9.
Figure 11:
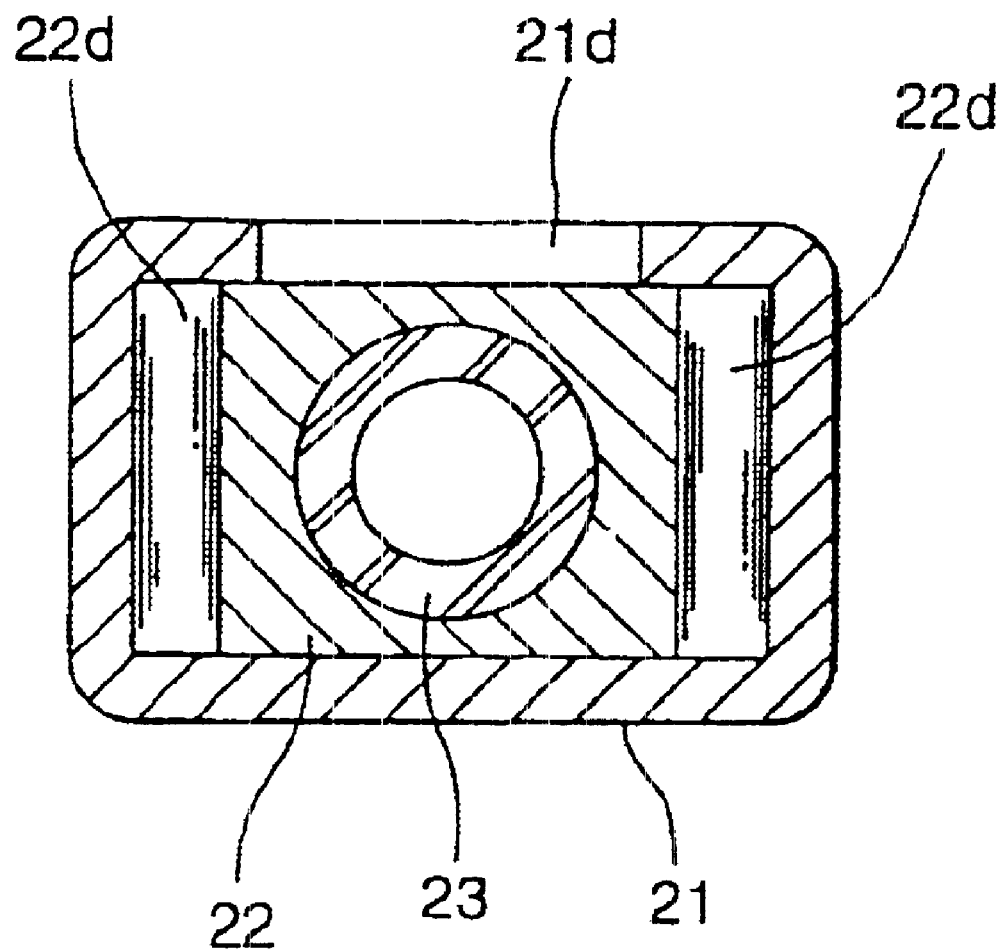
FIG. 11 is a sectional view showing the section of the lap-outer pretensioner 20 in the XI–XI' direction of FIG. 10.
Figure 12:
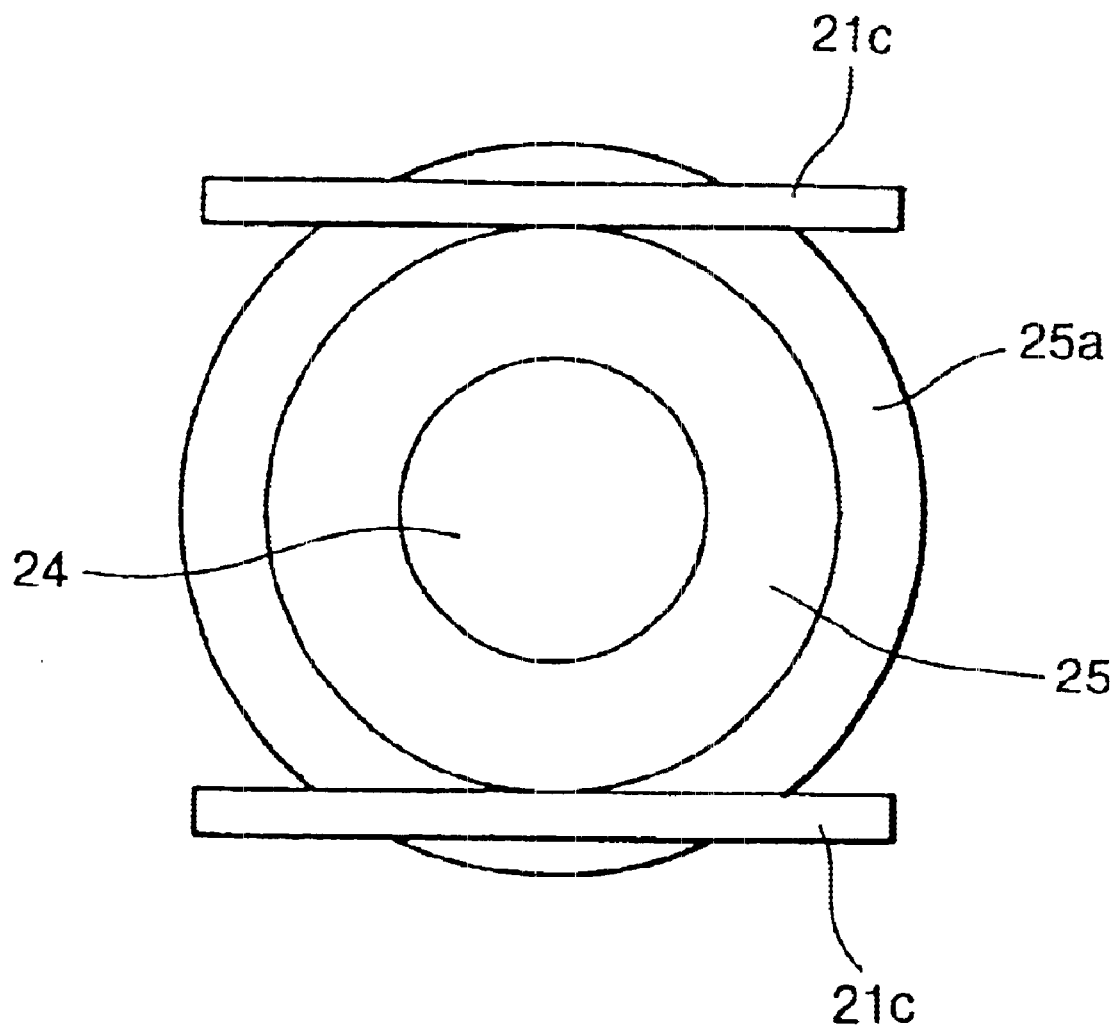
FIG. 12 is a side view showing the right side of the lap-outer pretensioner 20.

Structural examples of the lap-outer pretensioner 20 are now explained with reference to FIGS. 9 through 12 FIG. 9 is a plan view showing a partial section of the lap-outer pretensioner 20. FIG. 10 is a sectional view showing the section of the lap-outer pretensioner 20 in the X–X' direction of FIG. 9. FIG. 11 is a sectional view showing the section of the lap-outer pretensioner 20 in the XI–XI' direction of FIG. 10. FIG. 12 is a right side view showing the right side of the lap-outer pretensioner 20.

The lap-outer pretensioner 20 is basically structured of a base 21, slider 22, manifold 23, gas generator 24, cap 25, and so on.

As shown in FIG. 11, the base 21 is structured such that one end (left end) of a pipe having a quadrilateral cross section is formed flat via a taper, and the other end thereof (right end) is formed, as shown in FIG. 12, in two flat portions 21c via a taper. The shape of the base 21, however, is not limited to a circular cylinder and may be an angular cylinder shape.

A hole 21a, to which an anchor bolt for fixing the lap-outer pretensioner 20 to the body panel of the vehicle is passed through, is provided to the flat portion on the left side of the base 21.

Within the angular cylinder 21b in the center of the base 21, provided is a slider 22 which slides (glides) in the central axial direction of such cylinder within the angular cylinder. A moderately long window 21d is opened extending in the central axial direction on the upper face of the angular cylinder 21b in order to enable the anchor bolt 22b explained later to be movable. As shown in FIG. 11, the slider 22 has an angular columnar external shape and is a moderately long member extending in the central axial direction. A slant face 22e is formed in the vicinity of the right end of the slider 22 in FIG. 9, and a roller 22d is provided mutually between this slant face 22e and the inner side of the base 21. This slant face 22e and roller 22d allow the slider 22 to move leftward, but prevent such slider from moving rightward.

A cylindrical hole (cylinder) 22a is formed in the center of the right side of the slider 22 in the axial direction of the angular cylinder 21b. An anchor plate 5 for fixing one end of the seatbelt is mounted on the left end of the slider 22 with an anchor bolt 22b. The anchor bolt 22b is screwed into a screw groove 22f of the slider via a spacer 22c for securing a gap between the upper window 21d of the base and the anchor bolt 22b, and does not hinder the movement of the slider.

A manifold case 23 is installed inside the flat portion 21 on the right side of the base 21. The manifold case 23 includes a cylindrical nozzle 23a and a housing 23b having a funnel shaped slant face for housing the gas generator 24. The nozzle 23a is inserted into the cylinder 22a of the slider 22. An annular groove is formed in the outer periphery of the left tip of the nozzle 23a, and an O-ring seal 23c is arranged within such groove. The seal 23 secures the airtightness of the cylinder 22a and nozzle 23a, and prevents gas leakage upon the slider 22 moving.

Within the housing 23b of the manifold case 23, installed is a gas generator 24 with a cap 25 which is screwed with the screw thread formed on the outer periphery of such housing. A flange 25a is formed on the outer periphery of the cap 25. After inserting the manifold 23 with the gas generator 24 into the base 21, the flange 25a is inserted into the hole 21d of the base 21, and the flat portion 21c of the base 21 is caulked. The manifold case 23 is thereby fixed to the base 21.

As the aforementioned lap-outer pretensioner 20 has an airtight structure such that the overall stroke of the slider (cylinder) 22 on the manifold 23 is covered, gas leakage will not occur easily.

Figure 13:
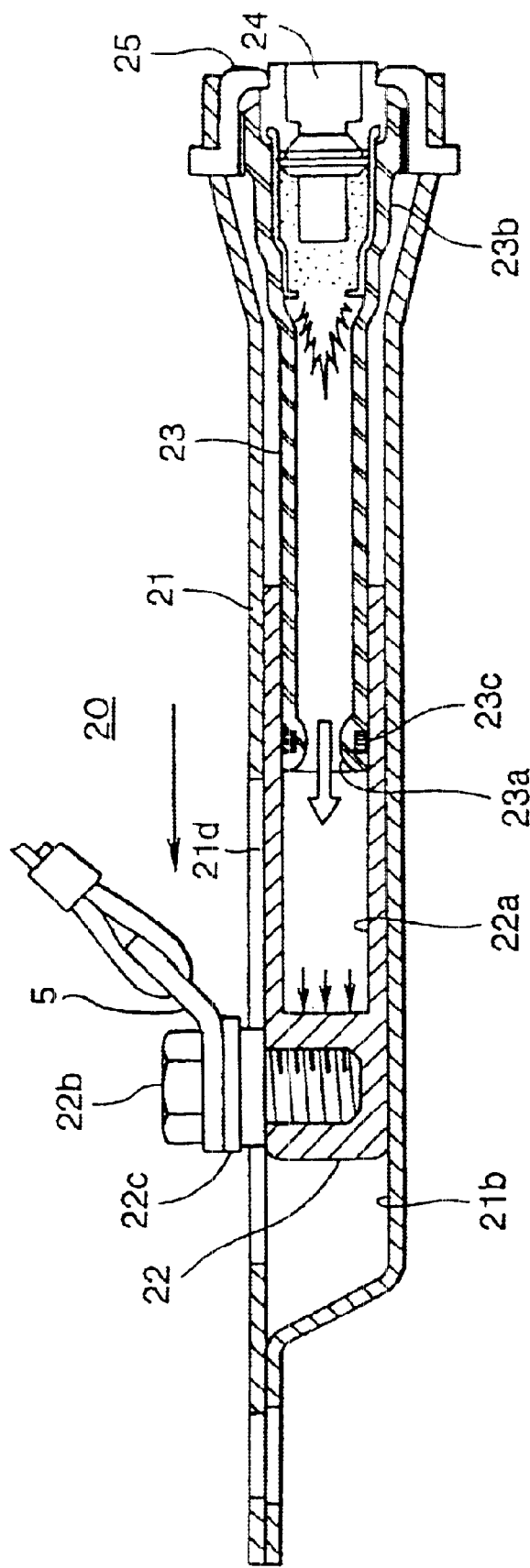
FIG. 13 is a diagram explaining an operation example of the lap-outer pretensioner 20.

The operation of the lap-outer pretensioner 20 is now explained with reference to FIG. 13, which shows the movement of the slider 22 when the pretensioner 20 is operated. When the ignition signal not shown is supplied to the gas generator 24, the powder is ignited with the plug not shown, and expansion gas is generated. This gas passes through the expansion chamber of the manifold 23 and strikes the bottom of the cylinder 22a of the slider from the opening on the tip of the nozzle 23a. As the cylinder 22a and manifold 23 are airtight due to the seal 23c, the expansion gas pushes the cylinder 22a and moves the slider 22 leftward. The anchor bolt 22b moves as a result thereof. The motion of this bolt moves the anchor plate 5 toward the rear of the vehicle and secures the passenger by tightening (retracting) the seatbelt 4. when the slider 22 tries to return rightward after moving leftward, the roller 22d bites into the space between the slant face 22e and the inner face of the base 21b due to the slant face 22e, and prevents the slider from returning.

Figure 14:
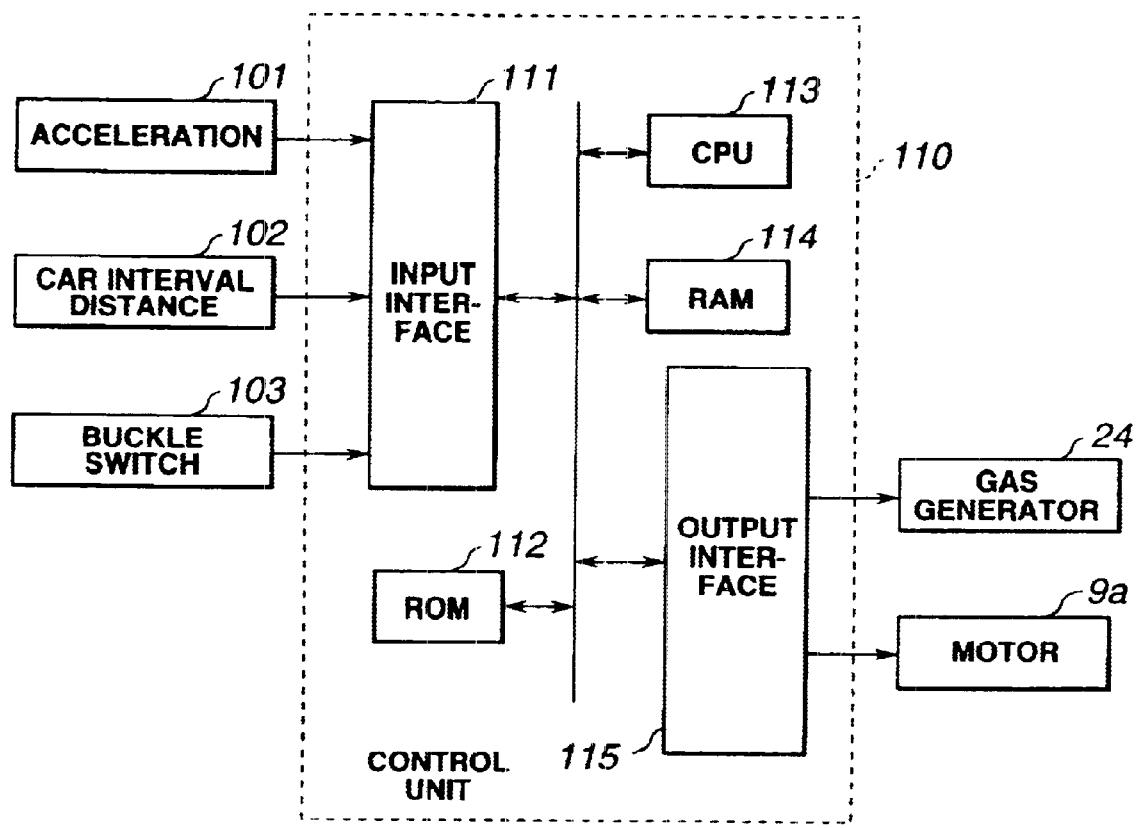
FIG. 14 is a block diagram explaining the control system of the seatbelt device.

FIG. 14 is a block diagram showing the structure of the control unit 110 of the seatbelt device. In FIG. 14, the acceleration sensor 101 detects the acceleration and deceleration of the running vehicle and supplies to the input interface 111 of the control unit 110 signals with a level corresponding to the acceleration.

The car interval distance sensor 102 measures the distance between one's car and the vehicle or obstacle in the frontward direction. This distance sensor 102, for example, measures such distance by emitting infrared pulse lasers, ultrasonic waves, or radio waves to the object concerned and measuring the time until such emission reverberates back from the object concerned. Signals representing such distance are supplied to the input interface 111 from the distance sensor 102. The buckle switch 103 detects that the tongue plate 7 is inserted into the buckle 11, and supplies detection signals to the input interface 111.

The control unit 110 performs the control of the lap-outer pretensioner 20 and the retractor 9 with a motor pursuant to the output of the acceleration sensor 101, distance sensor 102, buckle switch 103, and so on. The control unit 110 may also be realized by adding a control program explained later to the computer system installed in the vehicle.

The control unit 110 is structured of an input interface 111 for writing input data to the RAM 114 by DMA operation, a ROM 112 for storing a boot program, control program, data etc., a CPU 113 for implementing the control program, a RAM 114 for storing the control program, data etc., an input interface 115 for supplying control signals to the respective controllers concerned, and so on.

Figure 15A:
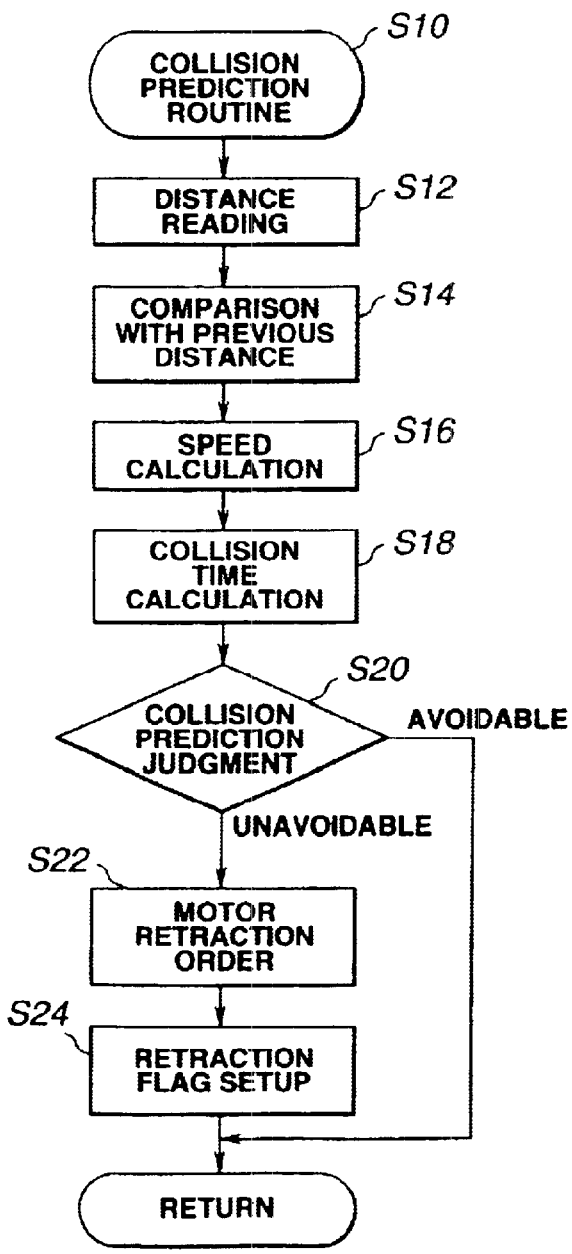
FIG. 15 is a flowchart explaining the control operation of the CPU.

FIG. 15(a) is a flowchart for explaining the collision estimate (prediction) processing of the CPU 113.

Foremost, the input interface 111 reads the output of the distance sensor 102 in prescribed time intervals, converts this to distance data, and writes this to the car interval distance area of the RAM 114. The input interface 111 further sets a flag ordering the implementation of the collision prediction routine to the interrupt flag register area of the RAM 114. It is possible to structure the interrupt flag register separate from the RAM 114. The writing interval of the distance data is variable. For example, when there is sufficient time for avoiding danger as the car interval distance between one's car and another party's car or an obstacle is fairly long, the time interval for reading the car interval distance is set long. Contrarily, when there is insufficient time for avoiding danger as the car interval distance is short, the reading interval of the car interval distance is set short.

The CPU 113 checks the on/off of the interrupt register flag in prescribed time intervals. Or, by setting a flag to an interrupt register structured separately form the RAM 114, the CPU 113 compulsorily performs interrupt processing upon generating interrupt signals in a hardware-like manner. When the CPU 113 detects that the interrupt flag for the writing of the car interval distance is set, it confirms the fastening of the seatbelt by the output of the buckle switch 103, and performs the collision prediction routine shown in FIG. 15(a) (S10).

The CPU 113 reads the current car interval distance (S12) and then compares this with the car interval distance previously read (S14). If the difference between the current and previous car interval distances is a positive value, there is a tendency of the distance becoming shorter. If the difference is a negative value, there is a tendency of the distance becoming longer. By dividing this difference in distance with the time difference between the previous and current measurements, the relative vehicle speed is obtained. By dividing the car interval distance with this relative vehicle speed, the collision time until collision is calculated (S18).

When this collision time becomes shorter than a predetermined standard time, less than 0.5 seconds for example, it is judged that the collision is unavoidable. If longer than the aforementioned time, it is judged that the collision is avoidable (S20). when it is judged that the collision is avoidable, the collision prediction processing is ended, and returns to the state prior to the interrupt processing (S20; avoidable).

When the collision is unavoidable (S20; unavoidable), the CPU 113 confirms that the seatbelt is fastened by the output of the buckle switch 103, and provides an order to the output interface 115 for making the motor of the retractor conduct retraction (S22). For a prescribed time frame, the output interface 115 supplies to the motor 9a a drive current from the built-in driving circuit. Thereby, the retractor 9 retracts the seatbelt 4 before the collision and the passenger 3 is secured to the seat 2. Preferably, this security is continued for a prescribed time (5 seconds for example) after the operation of the motor 9a, or until the disengagement of the buckle 11. The passenger is therefore secured to his/her seat until the impact has abated after the collision. The CPU 113 sets a retraction flag, which shows that the motor has retracted the seatbelt 4, to the flag register (S24). After this processing, it returns to the state before the interrupt processing.

Figure 15B:
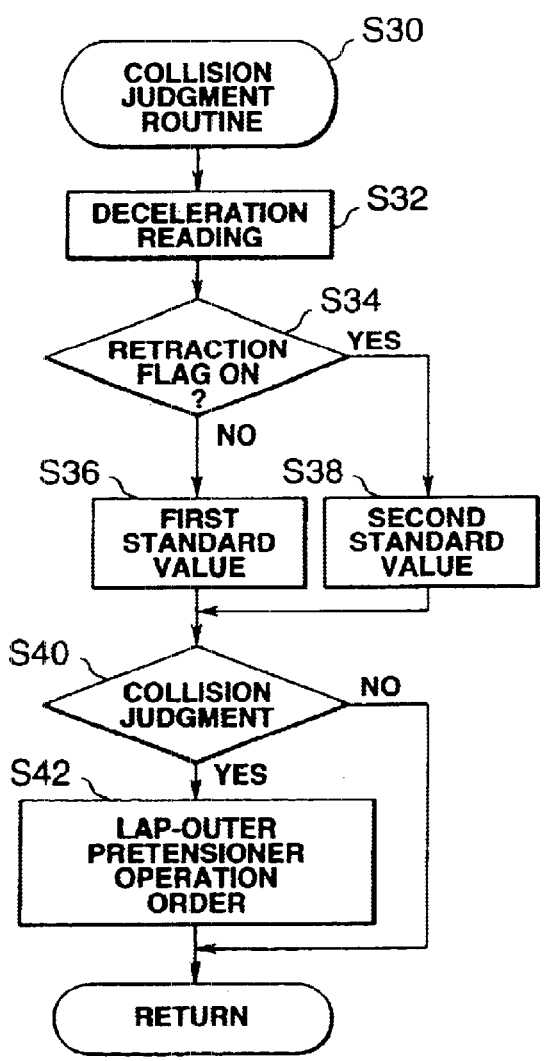

FIG. 15(b) is a flowchart explaining the collision judgment processing of the CPU 113.

The acceleration sensor 101 converts the acceleration (or deceleration) of the vehicle into electric signals and supplies such signals to the input interface 111. The acceleration signal processing circuit of the input interface 111, for example, is structured of a noise removal filter, a secondary incomplete integration circuit, a D/A converter, and so on (cf. FIG. 4). The noise removal filter removes the undesired frequency components of the acceleration signals, and further decreases the possibility of misjudgment due to the rise in acceleration signals observable during the latter half of a low-speed collision. The low-speed secondary incomplete integration circuit converts acceleration (deceleration) signals that passed through the filter into speed signals by integration, and further converts the obtained signals into displacement signals corresponding to the displacement (displacement of the passenger) by integration. These displacement signals become displacement data with the D/A converter. The input interface 111 writes this displacement data to the deceleration area of the RAM 114 with DMA operation, and sets a collision judgment flag to the interrupt flag register.

The CPU 113 periodically monitors the interrupt flag register, or becomes aware of the writing of the deceleration data (displacement) by the compulsory generation of interrupt signals. The CPU 113 confirms that the seatbelt is fastened pursuant to the output of the buckle switch 103, and performs the collision judgment routine (S30).

The CPU 113 reads the deceleration (displacement) from the RAM 114 (S32), and thereafter judges whether the retraction flag is set (S34). If the retraction flag is not set (S34; No), the first standard value is selected as the standard value (threshold value) in the subsequent collision judgment (S36). If the retraction flag is set (S34; Yes), the second standard value is selected as the standard value in the subsequent collision judgment (S38). The second standard value is set in advance to be a larger value (a difficult value for the pretensioner to relatively operate) than the first standard value.

The CPU 113 judges whether the deceleration (displacement) exceeds the selected standard value (S40). When the standard value is not exceeded (S40; No), that is, when the impact of the collision is small, the CPU 13 judges that it is not a collision or that it is not necessary to operate the pretensioner, and ends the routine. When the standard value is exceeded (S40; Yes), that is, when a certain degree of impact is inflicted, the CPU 113 sets to the output interface 115 order signals for operating the lap-outer pretensioner (S42). The output interface 115 sends an ignition signal to the plug of the gas generator 24. The pretensioner thereby operates and retracts the seatbelt 4. The passenger is secured to his/her seat and is protected upon collision. The CPU then ends the present routine and returns to the main program.

As mentioned above, when the collision prediction routine and the collision judgment routine are both implemented, ordinarily, the car interval distance is measured and the prediction of the collision is performed before the collision. When it is judged that it is difficult to avoid the collision, the motor 9a retracts the seatbelt 4, the slack in the seatbelt 4 is removed, and the passenger 3 is secured to the seat 2. In this situation, it is desirable that the powder pretensioner 20, which may be used only once, is operated only when necessary. Therefore, the threshold value of the collision judgment is set relatively high (second standard value) after the motor 9a retracts the seatbelt 4.

Accordingly, when the impact is small, the pretensioner 20 does not operate. When the impact is large, in addition to the retraction of the seatbelt by the motor 9a, the pretensioner 20 will also operate instantaneously. By utilizing the retractor 9, which may be used repeatedly, the pretensioner 20, which may be used only once, is operated only when absolutely necessary.

When a collision occurs outside the detection range of the (frontward) car interval distance sensor, for example, rear-end collision or side collision, retraction speed of the motor will be insufficient. In such case, the collision judgment applies the first standard value, which is relatively easy to operate, as the threshold value, and the pretensioner 20 quickly operates and retracts the seatbelt 4 in order to secure the passenger 3 to his/her seat.

Steps S24 through S32 may be implemented successively, and the processing steps of FIG. 15(a) and FIG. 15(b) may be performed as a series of processing steps. Moreover, steps S24, S34 through S38 may be omitted (by setting 4 fixed threshold value).

(Third Embodiment)

Figure 16:
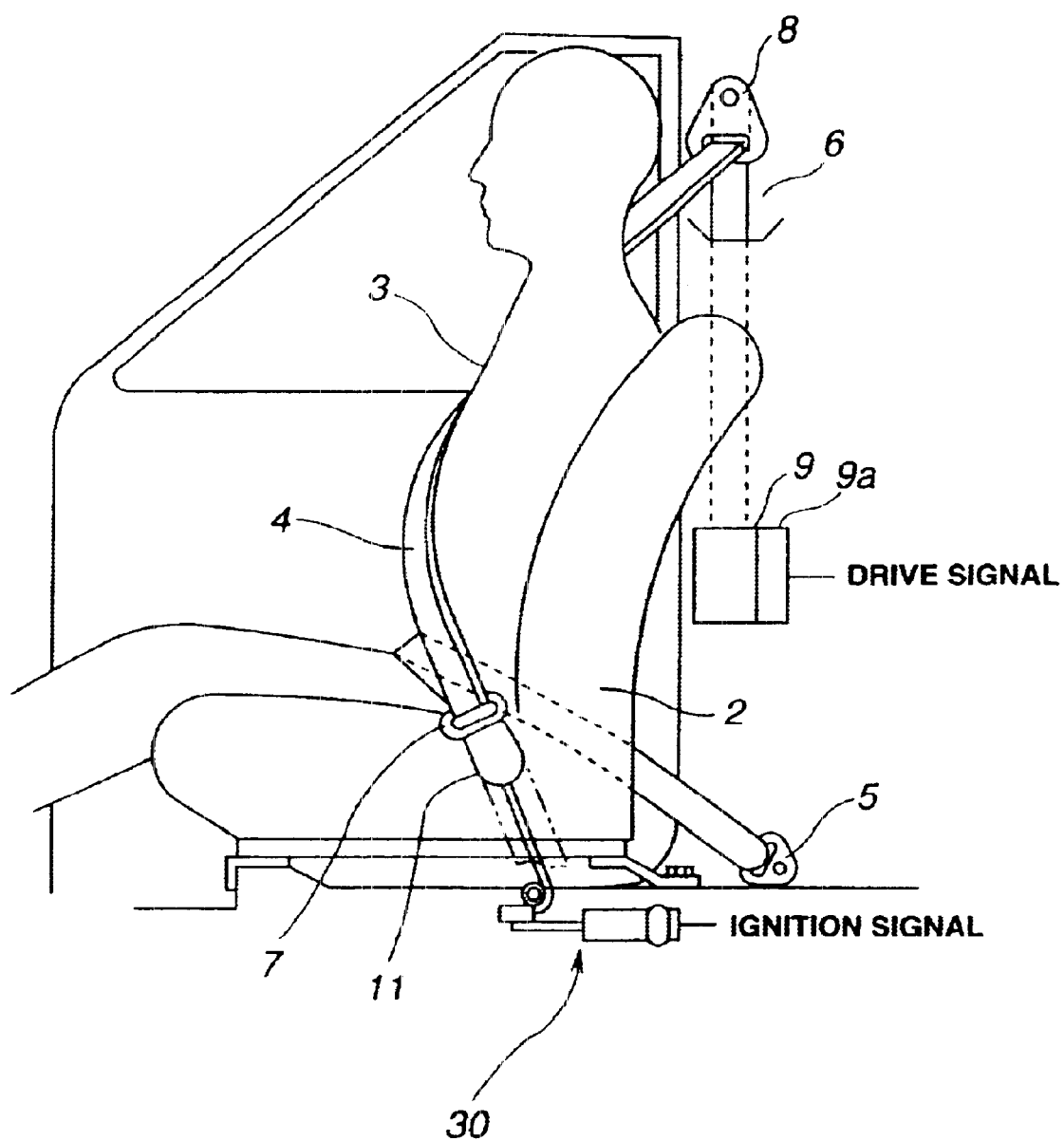
FIG. 16 is a diagram explaining the third embodiment of the seatbelt device according to the present invention.

FIG. 16 shows the third embodiment of the present invention. In FIG. 16, portions corresponding to FIG. 1 are given the same reference numerals, and the explanation thereof is omitted. In this example, as the pretensioner to be used in combination with the electromotive retractor 9, a buckle pretensioner 30 is used therefor.

Figure 17:
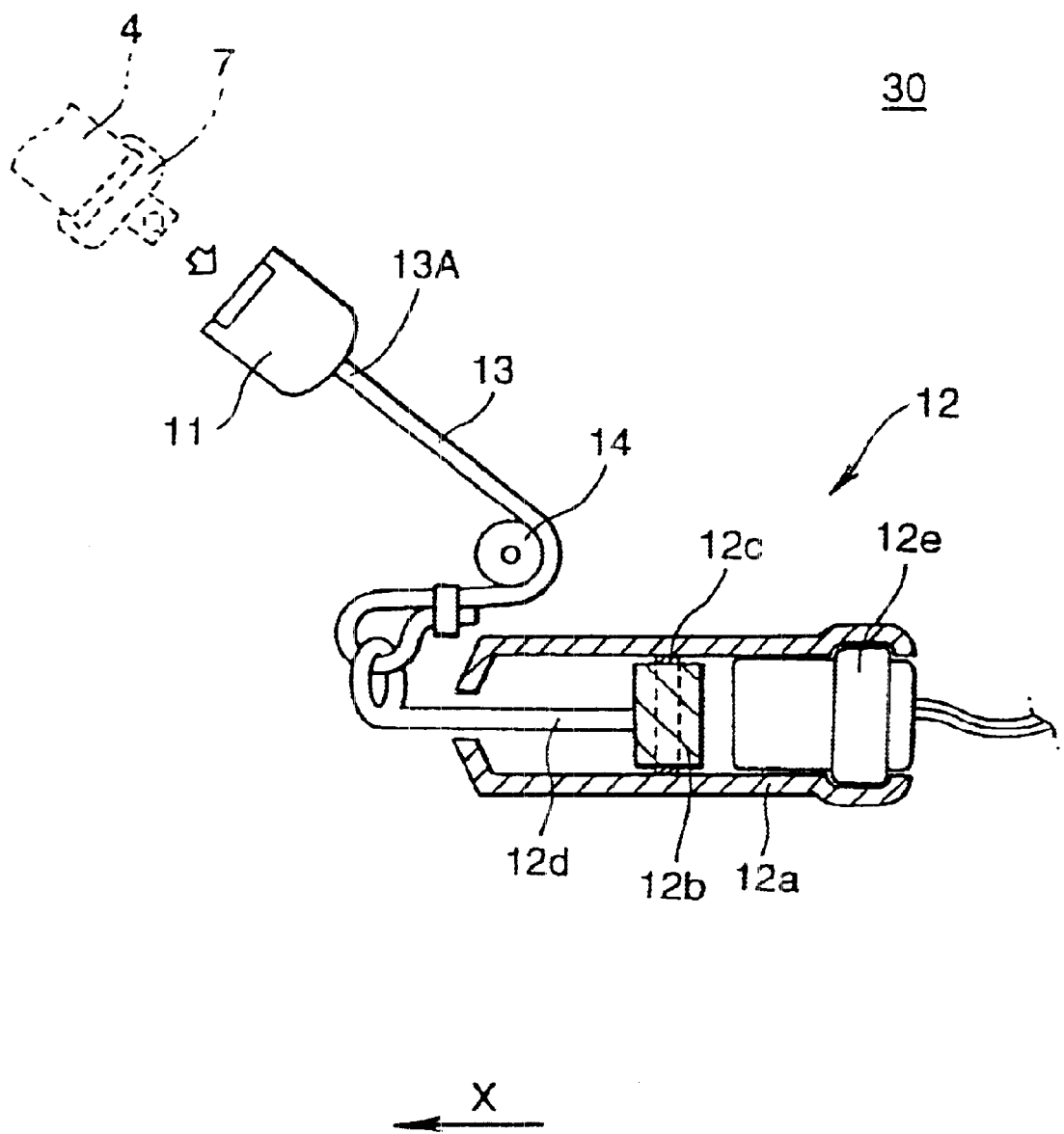
FIG. 17 is a diagram explaining the structural example of a buckle pretensioner 30.

As shown in FIG. 17, the buckle pretensioner 30 comprises, and is structured of, a buckle retractor 12 for retracting the buckle 11, a connecting member 13 for connecting the buckle retractor 12 and the buckle 11, and a pulley 14 for folding and changing the direction of the connecting member 13. The retractor 12 is structured of a seal 12c such as an O-ring provided to the outer periphery of the piston 12b, a connection rod 12d provided to the buckle 11 side of the piston 12b, and a gas generator arranged opposite to the buckle 11 within the cylinder 12a and for filling gas into the cylinder 12a.

In the aforementioned structure, when the ignition signal is supplied, the gas generator ignites the powder and generates expansion gas. The piston 12b is pushed and moved within the cylinder 12a by the pressure of the generated combustion gas. Provided to the space between the piston 12b and inner wall of the cylinder 12a is a seal 12c for making the space formed by the gas generator 12e and piston 12b airtight. Therefore, the combustion gas does not leak from the cylinder 12a, and the pressure within the cylinder may be efficiently converted into locomotive movement of the piston 12b.

In cases where the buckle pretensioner 30 is used as the pretensioner, a safe and secure operation, as with the seatbelt device 1, is also enabled with the aforementioned control unit 110.

Therefore, according to the second and third embodiments of the present invention, as a pretensioner and a retractor 9 with a motor, which is structured separately from such pretensioner, are combined, it is possible to priorly remove the slack in the seatbelt with a motor 9a when a collision is unavoidable (or when there is a danger of a collision). Thereby, as a pretensioner is operated in a state without any slack in the seatbelt, the passenger is effectively secured to his/her seat.

When it is difficult to avoid the collision, it is possible to priorly remove the slack in the seatbelt with the motor 9a, and thus, a pretensioner with small seatbelt retractability may be used. As this will allow the use of a small pretensioner, a (small) pretensioner may be used by being arranged in the gap between the seat and center pillar of the vehicle body or the small space at the lower part of the center pillar.

When the electromotive retractor and pretensioner are formed integrally, the size of the retractor becomes large, and will be difficult to house such retractor in a small space at the lower part of the center pillar. By structuring the electromotive retractor and the pretensioner separately as with the present invention, the respective components may be miniaturized and mounted.

There are cases when the space for mounting the seatbelt device is small, and the seatbelt retractability of the electromotive seatbelt cannot be sufficiently increased. In such case, when there is excess slack in the seatbelt, a desired tension may not be obtained even if the retractor is operated and the seatbelt is retracted. Nevertheless, by combining the retractor with a pretensioner, a desired tension may be obtained.

Although a powder (or gas-expansion) pretensioner may not be operated before the collision as it may be used only once, the tension is large and the passenger may be secured tightly. Although an electromotive retractor may be used repeatedly, the tension is small and the passenger may not be secured tightly. Thereby, a collision is predicted and the electromotive retractor removes the excess slack in the seatbelt before the operation of the powder pretensioner. As the powder pretensioner is operated when necessary with no slack in the seatbelt, the security of the passenger is more effective in comparison to a case when there is slack in the seatbelt. This prevents the heedless operation of the powder (or gas-expansion) pretensioner.

Furthermore, as the slack in the seatbelt is removed, the retractability of the pretensioner may be set small. This enables the miniaturization and lightening of the pretensioner. This is advantageous for buckle pretensioners and lap-outer pretensioners with the mounting space being small.

Moreover, the electromotive retractor may be provided, for example, to a seat as described in Patent Laid-Open Publication No. Hei 11(1999)-139250.

What is claimed is:

1. A seatbelt device, comprising:
   a seatbelt for securing a passenger to a seat;
   a retractor for retracting one end of said seatbelt;
   a tongue plate through which said seatbelt passes;
   a buckle arranged in the vicinity of the abdominal region of said passenger and connected removably to said tongue plate;
   a collision prediction device for predicting a collision of a vehicle with an obstacle and generating a collision unavoidable signal when a distance from the vehicle to the obstacle is less than or equal to a collision unavoidable distance;
   a collision detection device for generating a collision signal upon detecting a collision based on the impact acceleration inflicted upon the vehicle upon collision;
   a first seatbelt tension increasing element for increasing the tension of said seatbelt when said collision unavoidable signal is received,
   a second seatbelt tension increasing element for increasing the tension of said seatbelt when said collision signal is received,
   wherein said first seatbelt tension increasing element increases the tension of the seatbelt before said second seatbelt tension increasing element increases the seatbelt tension, and after activation, said first seatbelt tension increasing element continues in operation until the impact acceleration has abated after the collision of the vehicle or until the buckle is disengaged.

2. A seatbelt device according to claim 1, wherein said first seatbelt tension increasing element increases the tension of said seatbelt with the driving force of a motor, and said second seatbelt tension increasing element increases the tension of said seatbelt with a power generating mechanism using expansion gas.

3. A seatbelt device according to claim 1, wherein said collision prediction device outputs the collision unavoidable signal at least 0.1 second before the collision, and the first seatbelt tension increasing element operates before the collision.

4. A seatbelt device according to claim 1, wherein said first seatbelt tension increasing element, after activation, continues in operation for at least 5 seconds.

5. A seatbelt device according to claim 2, wherein said first and second seatbelt tension increasing element are provided within said retractor.

6. A seatbelt device according to claim 2, wherein said first seatbelt tension increasing element is provided to said retractor, and said second seatbelt tension increasing element is mounted on a mounting portion which mounts said buckle or the other end of said seatbelt to the vehicle body.

7. A seatbelt device according to claim 3, wherein said collision prediction device for predicting said collision measures the distance from one's vehicle to the obstacle, obtains the time until collision by dividing said distance with the speed of one's vehicle, and judges whether or not the collision is avoidable.

8. A seatbelt device according to claim 7, wherein said collision prediction device includes at least one among an infrared laser radar, millimeter wave radar, or ultrasonic radar for conducting said measurement of distance by measuring the reverberation of the detection wave from the obstacle.

9. A seatbelt device according to claim 7, wherein said collision prediction device includes a stereo camera for conducting said measurement of distance by trigonometrical survey.

10. A seatbelt device according to claim 1, wherein said first and second seatbelt tension increasing element increase the tension of said seatbelt by the driving force of their respective motors.

11. A seatbelt device, comprising:
    a seatbelt for securing a passenger to a seat of a vehicle;
    an electromotive retractor for retracting said seatbelt with a motor;
    a pretensioner for rapidly retracting said seatbelt using expansion gas as the driving power source;
    a collision prediction element for predicting a collision of said vehicle;
    a collision detection element for detecting the collision of said vehicle; and
    a control unit for controlling at least the operation of said electromotive retractor based on the output of said collision prediction element and the operation of said pretensioner based on the output of said collision detection element, wherein said control unit sets a threshold value on a collision judgment of said collision detection element in accordance with the action/non-action of said electromotive retractor based on the output of said collision prediction element, in the case of the electromotive retractor being activated, a higher threshold value is set compared with the threshold value for a case of the electromotive retractor being non-activated to lessen a likelihood of the collision judgment as a collision.

12. A seat belt device according to claim 11, wherein said control unit changes a detection standard so that said pretensioner is less likely activated in case said electromotive retractor is activated.

13. A seatbelt device, comprising:
- a seatbelt for securing a passenger to a seat;
- a retractor for retracting one end of said seatbelt;
- a tongue plate through which said seatbelt passes;
- a buckle arranged in the vicinity of the abdominal region of said passenger and connected removably to said tongue plate;
- a collision prediction device for predicting a collision of a vehicle with an obstacle and generating a collision unavoidable signal when a time or distance from the vehicle to the obstacle is less than or equal to a collision unavoidable time or distance;
- a collision detection device for generating a collision signal upon detecting a collision based on the impact acceleration inflicted upon the vehicle upon collision;
- a first seatbelt tension increasing element for increasing the tension of said seatbelt when said collision unavoidable signal is received,
- a second seatbelt tension increasing element for increasing the tension of said seatbelt when said collision signal is received,
- wherein said first seatbelt tension increasing element increases the tension of the seatbelt before said second seatbelt tension increasing element increases the seatbelt tension, and after activation, said first seatbelt tension increasing element continues in operation until the impact acceleration has abated after the collision of the vehicle or until the buckle is disengaged.

* * * * *